United States Patent
Centner

(10) Patent No.: US 8,514,059 B2
(45) Date of Patent: Aug. 20, 2013

(54) TRANSPONDER HOLDER FOR CONTROLLING THE OPERATION OF A TRANSPONDER

(75) Inventor: David Centner, Great Neck, NY (US)

(73) Assignee: Highway Toll Administration, LLC, Great Neck, NY (US)

( * ) Notice: Subject to any disclaimer, the term of this patent is extended or adjusted under 35 U.S.C. 154(b) by 369 days.

(21) Appl. No.: 12/852,050

(22) Filed: Aug. 6, 2010

(65) Prior Publication Data

US 2011/0050398 A1   Mar. 3, 2011

Related U.S. Application Data

(60) Provisional application No. 61/231,897, filed on Aug. 6, 2009.

(51) Int. Cl.
*H04Q 5/22*    (2006.01)
(52) U.S. Cl.
USPC ....... 340/10.1; 340/572.8; 248/682; 248/685; 248/686; 248/309.1; 248/311.2; 248/317; 248/206.3; 248/205.5; 248/683
(58) Field of Classification Search
USPC ......................................... 340/10.1
See application file for complete search history.

(56) References Cited

U.S. PATENT DOCUMENTS

| | | |
|---|---|---|
| 3,231,854 A | 1/1966 | Gran |
| 4,216,857 A | 8/1980 | Huang |
| 4,227,037 A | 10/1980 | Layton |
| 4,312,917 A | 1/1982 | Hawley |
| 4,401,216 A | 8/1983 | Koch |
| 4,567,317 A | 1/1986 | Ehrlich et al. |
| 4,684,020 A | 8/1987 | Ohlbach |
| RE32,772 E | 10/1988 | Hawley |
| 4,896,855 A * | 1/1990 | Furnish ............. 248/206.3 |
| 5,069,376 A | 12/1991 | Barel |
| 5,097,885 A | 3/1992 | Kitagawa |
| 5,097,949 A | 3/1992 | Heldwein |
| 5,253,162 A | 10/1993 | Hassett et al. |
| 5,310,999 A | 5/1994 | Claus et al. |
| 5,339,222 A | 8/1994 | Simmons et al. |
| 5,483,423 A | 1/1996 | Lewis et al. |
| 5,485,520 A | 1/1996 | Chaum et al. |

(Continued)

FOREIGN PATENT DOCUMENTS

| | | |
|---|---|---|
| JP | 2001175899 A | 6/2001 |
| JP | 2001195622 A | 7/2001 |
| JP | 2006076368 A | 3/2006 |

OTHER PUBLICATIONS

EZShield.com Web pages (4) EZ Shield LLC (2002).

(Continued)

*Primary Examiner* — George Bugg
*Assistant Examiner* — Anthony D Afrifa-Kyei
(74) *Attorney, Agent, or Firm* — Hoffmann & Baron, LLP

(57) ABSTRACT

Exemplary embodiments are directed to a transponder holder for controlling the readability of a transponder by an interrogator. Embodiments of the transponder holder can be removable mounted to a support structure, such as a windshield of a motor vehicle. The transponder can be supported by a plate of the transponder holder, which can be moved to position the transponder in a readable position and an unreadable position to allow a user to select whether the transponder is readable by an interrogator.

28 Claims, 25 Drawing Sheets

(56) References Cited

U.S. PATENT DOCUMENTS

| | | | |
|---|---|---|---|
| 5,502,912 | A | 4/1996 | LeBoff et al. |
| 5,522,163 | A * | 6/1996 | Neugebauer .................... 40/780 |
| 5,602,919 | A | 2/1997 | Hurta et al. |
| 5,677,511 | A | 10/1997 | Taylor et al. |
| 5,726,867 | A | 3/1998 | Zarreii |
| 5,761,054 | A | 6/1998 | Kuhn |
| 5,767,789 | A | 6/1998 | Afzali-Ardakani et al. |
| 5,819,234 | A | 10/1998 | Slavin et al. |
| D400,704 | S | 11/1998 | Leinberger |
| 5,850,957 | A | 12/1998 | Morris |
| 5,955,970 | A | 9/1999 | Ando et al. |
| 5,960,572 | A | 10/1999 | DeVito |
| 5,986,562 | A | 11/1999 | Nikolich |
| 6,008,727 | A | 12/1999 | Want et al. |
| 6,104,291 | A | 8/2000 | Beauvillier et al. |
| 6,127,938 | A * | 10/2000 | Friedman .................... 340/693.6 |
| 6,342,830 | B1 | 1/2002 | Want et al. |
| 6,390,429 | B1 | 5/2002 | Brincat |
| 6,452,507 | B1 | 9/2002 | Friedman |
| 6,477,370 | B1 | 11/2002 | Sigler et al. |
| D477,909 | S | 8/2003 | Harris |
| 6,617,963 | B1 | 9/2003 | Watters et al. |
| 6,658,775 | B1 | 12/2003 | Lanzisero |
| 6,745,925 | B2 | 6/2004 | Brzyski |
| 6,957,755 | B2 | 10/2005 | Mahoney et al. |
| D525,024 | S | 7/2006 | Fridie et al. |
| 7,080,764 | B2 | 7/2006 | McNicholas |
| D563,331 | S | 3/2008 | Rosen |
| 7,421,245 | B2 | 9/2008 | Lieffort et al. |
| 2003/0057131 | A1 | 3/2003 | Diaferia |
| 2007/0040679 | A1 | 2/2007 | Klosinski |
| 2007/0158378 | A1 | 7/2007 | Rafalowitz et al. |
| 2009/0146862 | A1 | 6/2009 | Malone |
| 2012/0081211 | A1 * | 4/2012 | Centner et al. ................ 340/10.1 |

OTHER PUBLICATIONS

U.S. Appl. No. 12/079,644, filed Mar. 28, 2008 by David Centner.

U.S. Appl. No. 12/404,922, filed Mar. 16, 2009 by David Centner.

* cited by examiner

TRANSPONDER HOLDER FOR CONTROLLING THE OPERATION OF A TRANSPONDER

This application claims the benefit of priority to U.S. Provisional Patent Application Ser. No. 61/231,897 filed on Aug. 6, 2009, the disclosure of which is incorporated by reference herein in its entirety for all purposes.

FIELD OF THE INVENTION

The present invention relates to a transponder holder, more specifically, transponder holder which may control the operation of the transponder.

BACKGROUND OF THE INVENTION

The use of electronic toll collection systems is becoming evermore popular as a way of managing traffic volume through toll collection points. Such systems typically include a reader at the toll station which interrogates a wireless payment device located on a vehicle. The payment device may be a transponder, such as an RFID (radio frequency identification device). Upon interrogation by a reader, the transponder emits a radio frequency signal that includes information corresponding to an account code unique to the transponder. Therefore, the user can be properly charged for going through the toll. Such transponders are marketed by Mark IV Transportation Technologies Group and TransCore. The transponders operate with toll collection systems such as E-ZPASS® and SunPass®. In order to function properly, the transponder must be in radio frequency ("RF") communication with the interrogator. If this communication is interrupted, the transponder will not be acknowledged. Therefore, the transponder is typically located on the windshield or other part of the vehicle where it is unobstructed by the metal body of the vehicle.

At times it may be desirable for a driver of a vehicle to pay for the toll directly and not rely upon the payment device in the vehicle. For example, if the driver has rented the car from a rental company, the driver may prefer to pay the toll themselves as opposed to relying on the transponder provided with the rental car.

Furthermore, at times it may be desirable for the driver to selectively "turn off" the transponder in instances where the driver is not required to pay a toll (for example, in "high occupancy vehicle" situations) and removal of the transponder from the windshield is not feasible or practical. Compounding the issue is that transponders may include peel-and-stick credit form factors, whereby removal from the windshield may damage the transponder and effectively destroy its transmission capabilities.

Furthermore, at times a driver may want to transfer a transponder to another vehicle, which is difficult, if not impossible, when the transponder is of the peel-and-stick variety.

Accordingly, it would be desirable to provide a wireless device holder which selectively permits the wireless device to be prevented from communicating with another device.

SUMMARY OF THE INVENTION

The present invention provides a transponder holder for supporting a transponder on a support surface of a vehicle. The transponder holder includes a housing having a housing interior, a transponder mounting plate, and an actuator. The transponder mounting plate is adapted to support a transponder. The mounting plate is movably attached to the housing. The actuator is disposed on the housing for moving the mounting plate relative to the housing between a first position in which the mounting plate is positioned proximate to a front face of the housing and a second position in which the mounting plate is spaced a distance away from the front face.

The present invention also provides a transponder holder having a plate, a pair of spaced guide members, and an actuator. The plate is adapted to receive a transponder thereon. The plate is selectively movable with respect to the housing and includes pins extending therefrom. The pair of spaced guide members includes a plurality of slots formed therein. The plate pins extending into the slots wherein the movement of the plate is guide by a cooperation between the pins and the slots. The actuator is operatively coupled to the plate for moving the plate between a first position in which the plate is positioned at a front end of the guide members and a second position in which the plate is positioned at a back end of the guide members.

The present invention also includes transponder holder having a housing with a housing interior, a plate, and an actuator. The plate is hingedly attached to the housing and is adapted to retain a transponder thereon. The actuator is disposed on the housing for moving the plate relative to the housing between a first position in which the plate is proximate to a front face of the housing and a second position in which the plate is displaced into the housing away from the front face.

The present invention also includes a selectively readable transponder. The selectively readable transponder can include a transponder holder, a plate, and a transponder. The transponder holder includes a housing defining a housing interior, a plate, and an actuator. The plate is moveably attached to the housing. The actuator is disposed on the housing for moving the plate between a first position in which the plate is proximate to a front face of the housing and a second position in which the plate is displaced into the housing away from the front face. The transponder is adapted to communicate with a remote interrogator. The transponder is secured to the plate, wherein the transponder is rendered readable by the interrogator when the plate is in the first position and rendered unreadable when the plate is in the second position.

The present invention still further provides a method of selectively rendering a transponder operable and non-operable including:

obtaining a transponder holder including a housing defining a housing interior, a mounting plate pivotally secured to the housing, the plate being movable between a first and second position;

applying a transponder to the mounting plate;

securing the transponder holder to a support structure in a vehicle; and moving the mounting plate to the first position such that the transponder is in contact with the support structure and rendered operable, and moving the mounting plate to a second position away from the support structure in order to render the transponder inoperable.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

Exemplary embodiments include a transponder holder that controls the readability of a transponder by an interrogator. Embodiments of the transponder holder can be removable mounted to a support structure, such as a windshield of a motor vehicle. The transponder can be supported by a plate of the transponder holder, which can be moved to position the transponder in a readable position and an unreadable position to allow a user to select whether the transponder is readable by an interrogator.

Figure 1:
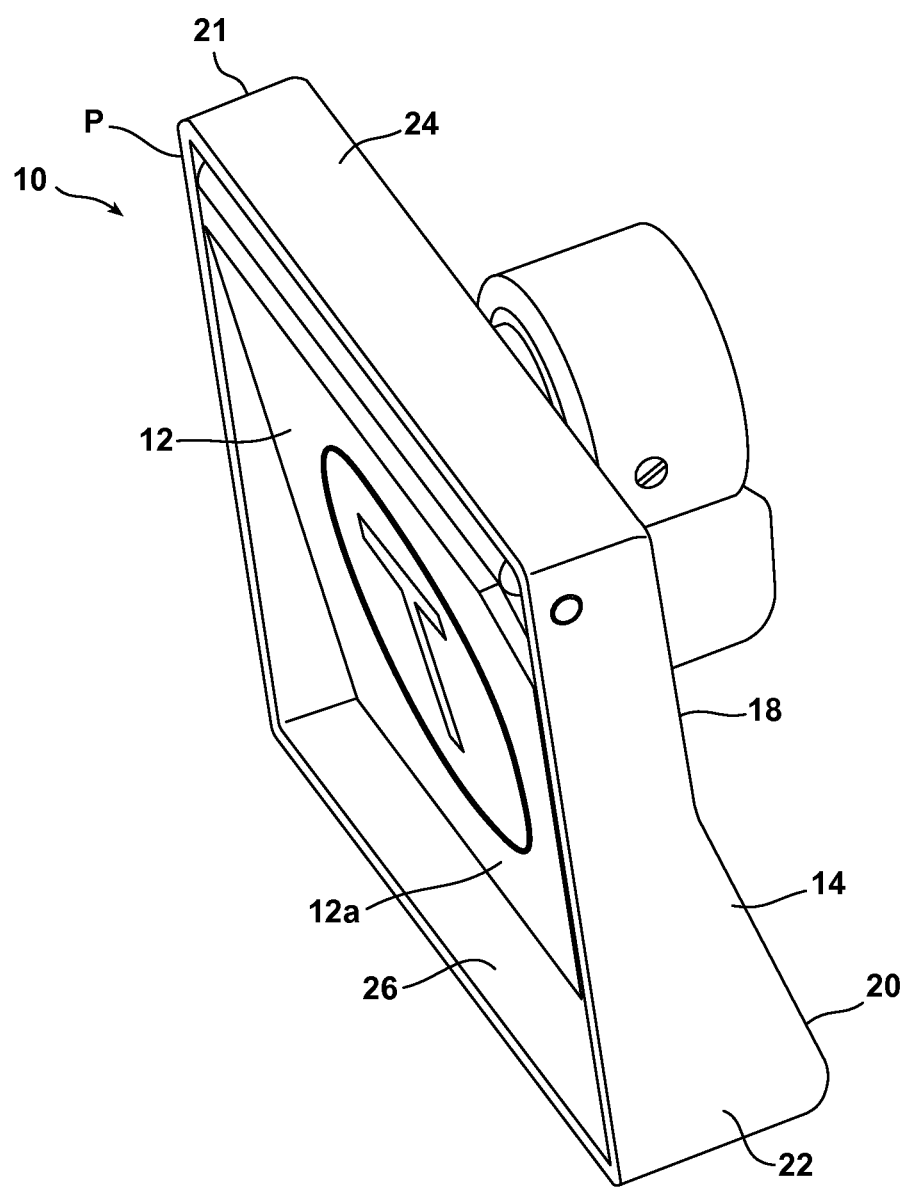
FIG. 1 is a top perspective view of the transponder holder of the present invention.
Figure 2:
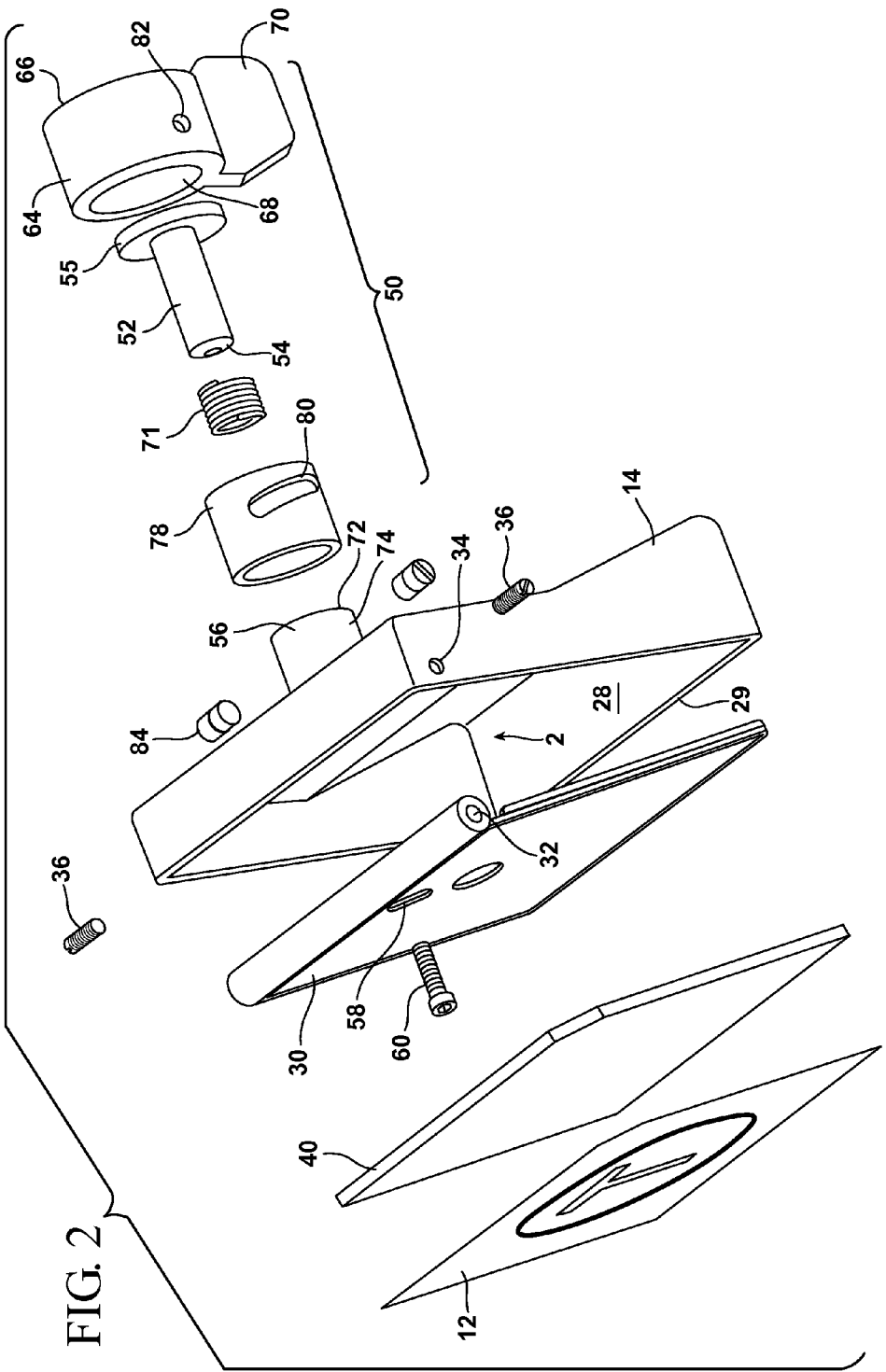
FIG. 2 is an exploded view of the transponder holder of FIG. 1.
Figure 3:
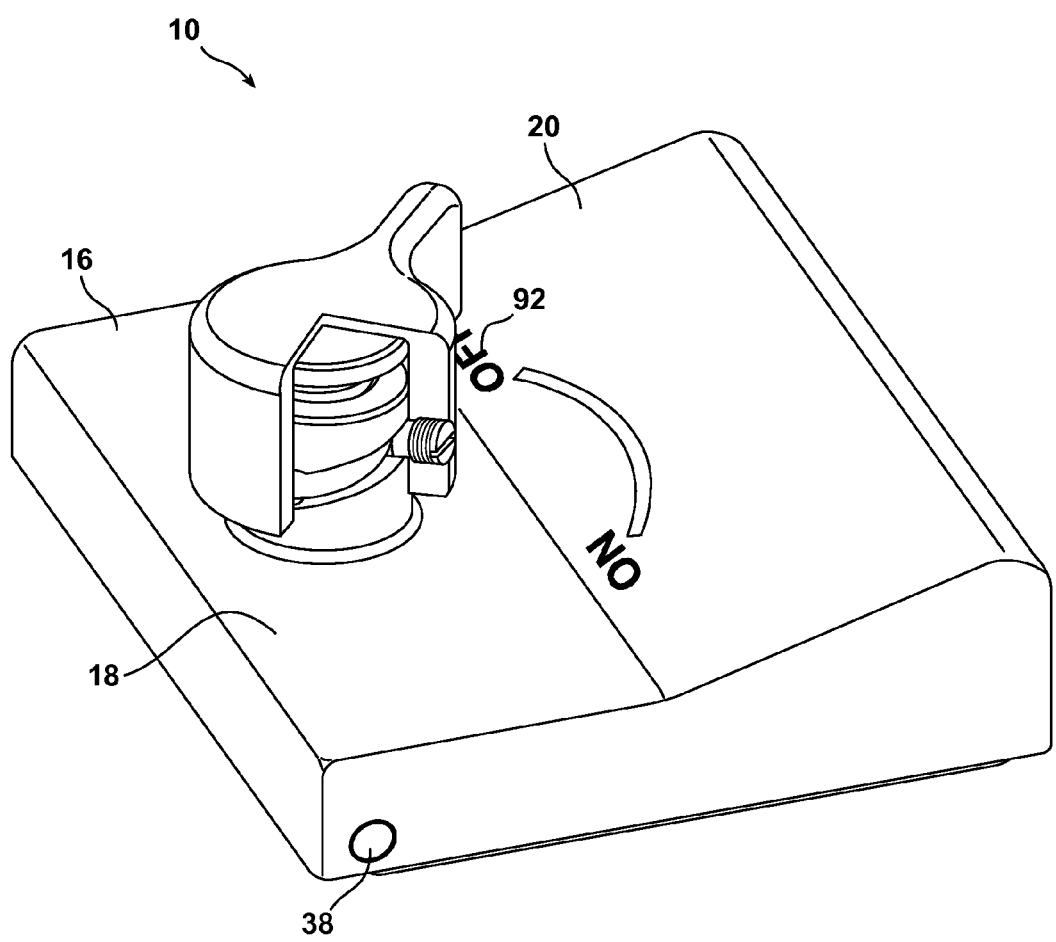
FIG. 3 is a rear perspective view of the transponder holder of FIG. 1.

With reference to FIGS. 1-3, a transponder holder 10 that controls the operability of a transponder by selectively rendering a wireless transponder device 12 readable and non-readable by an outside interrogation system. The wireless device may be in the form of an RFID-type transponder which emits an RF signal in response to an interrogation signal emitted from an interrogator. The transponder 12 may further be a thin flexible member such as a sticker tag including peel-and-stick type tags. The transponder 12 may function as a toll payment device typically used in electronic toll collection systems. The payment device transponder 12 communicates with an interrogation device located at the toll plaza which reads the signal generated by the transponder. It is also within the contemplation of the present invention that the transponder holder 10 could contain other types of devices which emit and/or receive electronic signals.

In order for the transponder 12 to operatively communicate with an interrogator, the transponder front surface 12a should be held against the inner surface of a support surface such as a windshield. If the front surface 12a is moved away from the windshield, the transponder will not communicate with the interrogator, thereby rendering the transponder effectively inactive or inoperable. Accordingly, the transponder holder 10 described herein permits a user to selectively move the transponder 12 into and out of contact with the windshield, thereby effectively rendering the transponder 12 either operable or inoperable.

The transponder holder 10 may include a housing 14 including a back wall 16 having a first portion 18 and a second portion 20. The back wall 16 is surrounded by a perimeter wall 21 including opposed sidewalls 22, a top wall 24, and bottom wall 26. Each of the walls forms a housing interior 28 so that the housing has a cavity 2. The back wall second portion 20 extends at an angle θ (FIG. 6) from the first portion 18 such that the bottom portion of the housing interior is deeper than the upper portion. The perimeter wall includes a front face 29 (FIG. 2) which defines and lies in a plane, P. The holder housing 14 may be formed of plastic.

Figure 4:
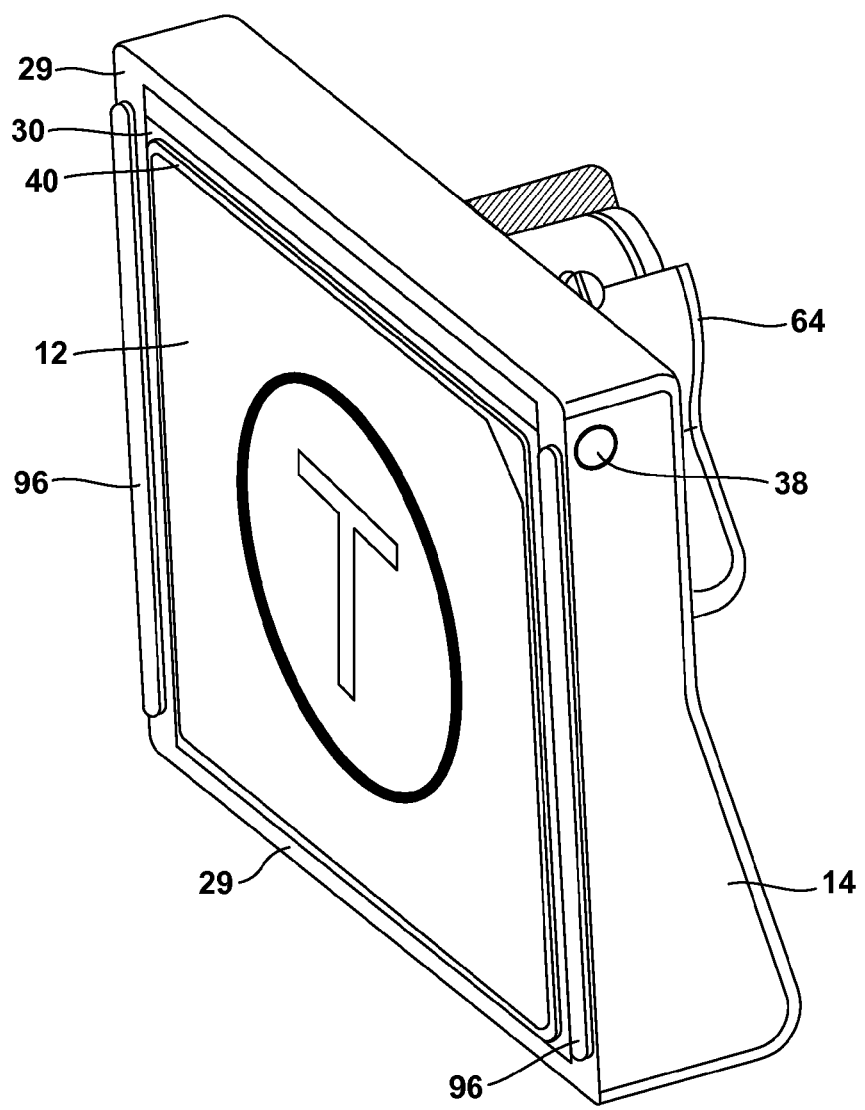
FIG. 4 is a front perspective view of the transponder holder of FIG. 1 showing a transponder and a mounting plate in a first position
Figure 5:
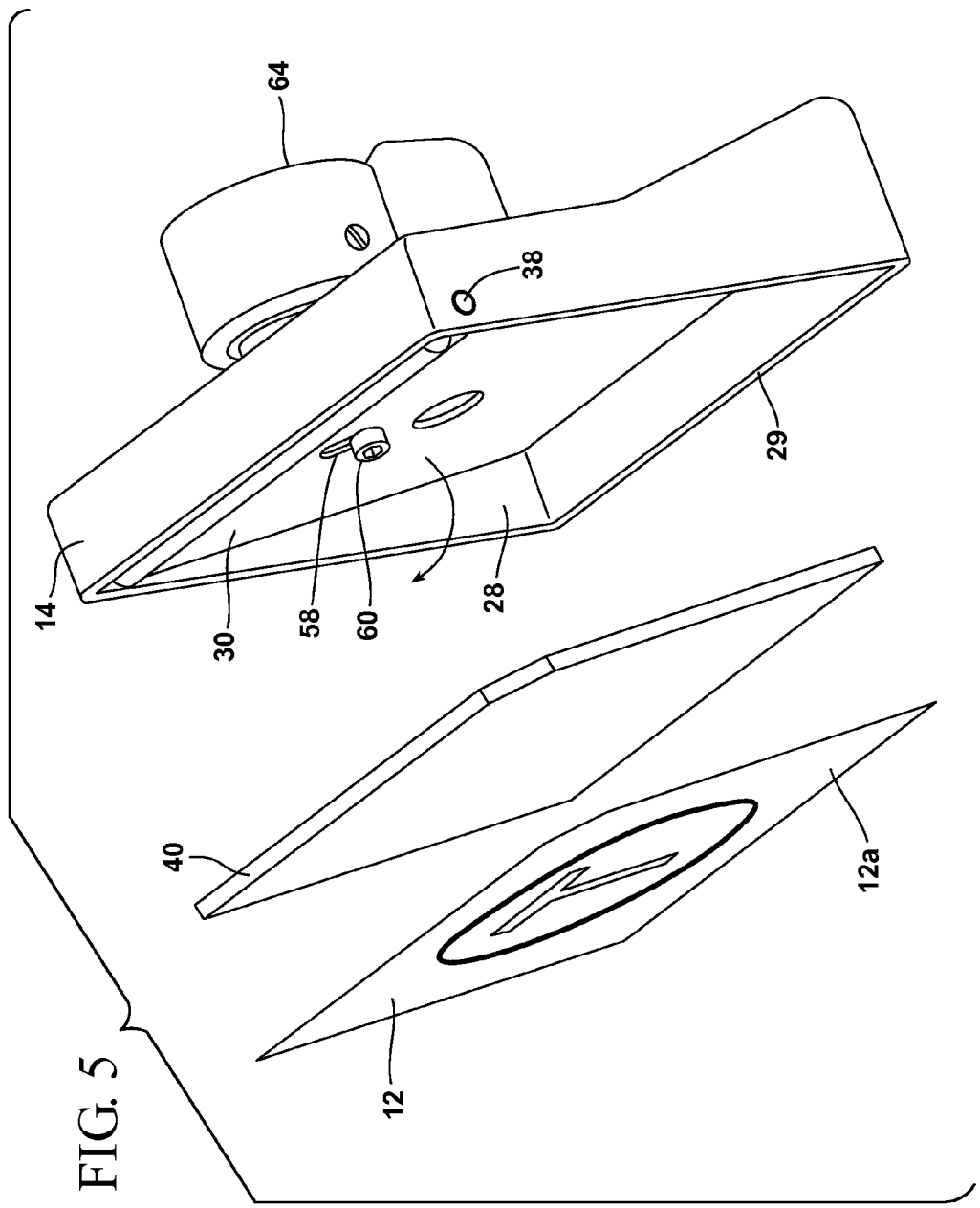
FIG. 5 is partial exploded view of the transponder holder showing the mounting plate in a second position.
Figure 8:
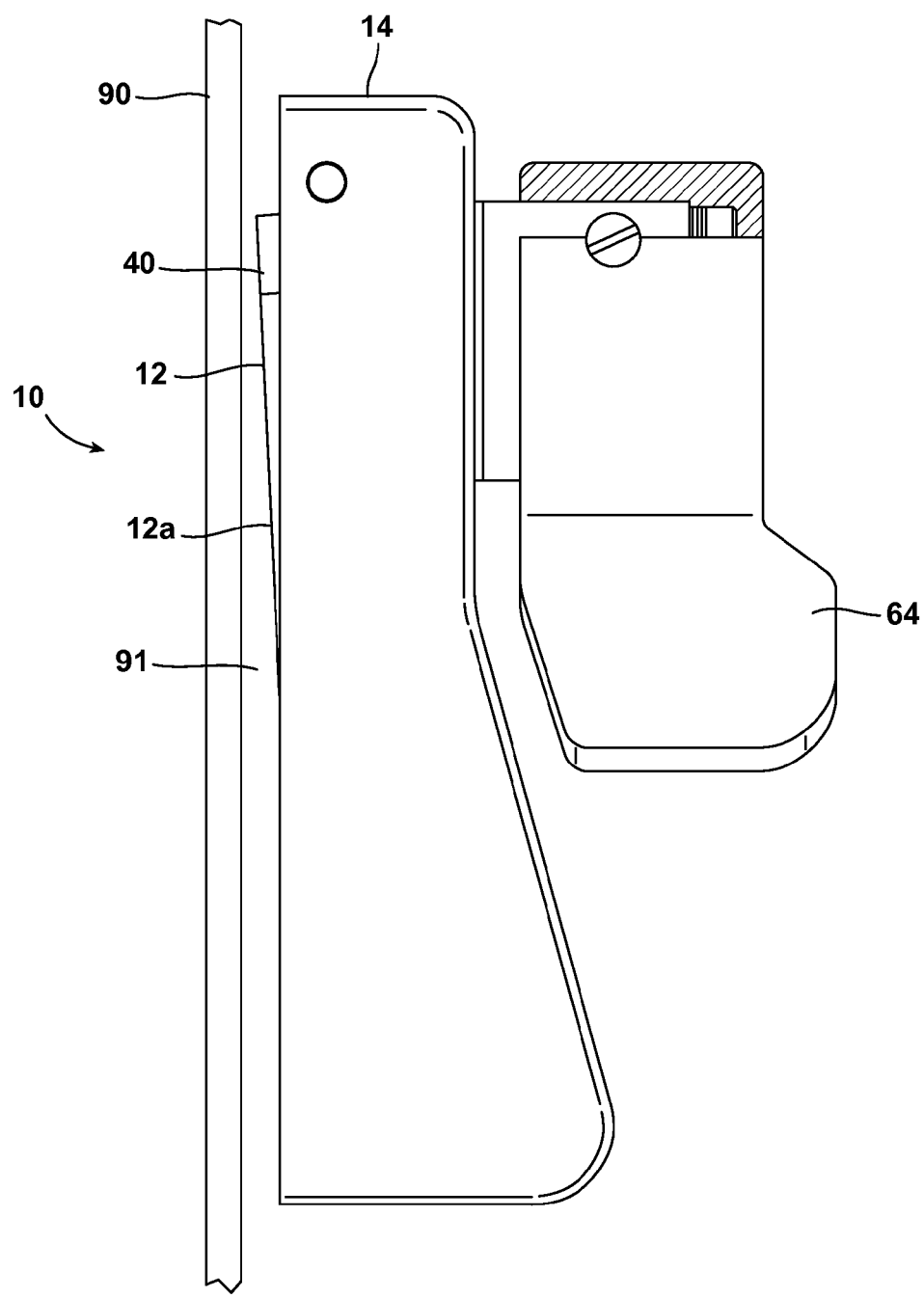
FIG. 8 is a side elevational view of the transponder holder showing the transponder in the second position.

A mounting plate 30 may be disposed within the housing interior 28 and hingedly attached to the housing 14. The plate 30 may include openings 32 along an upper portion thereof. The openings 32 in the plate align with apertures 34 formed in the housing sidewalls 22. Hinge pins 36 extend through the apertures 34 into the plate openings 32 in order to form a hinge 38. The hinge 38 permits the mounting plate 30 to rotate between a first position where the mounting plate 30 is essentially flush with a front face 29 of the housing, as shown in FIG. 4, to a second position wherein the plate 30 is inclined into the housing interior and away from the front face 29, as shown in FIGS. 5 and 8.

Figure 6:
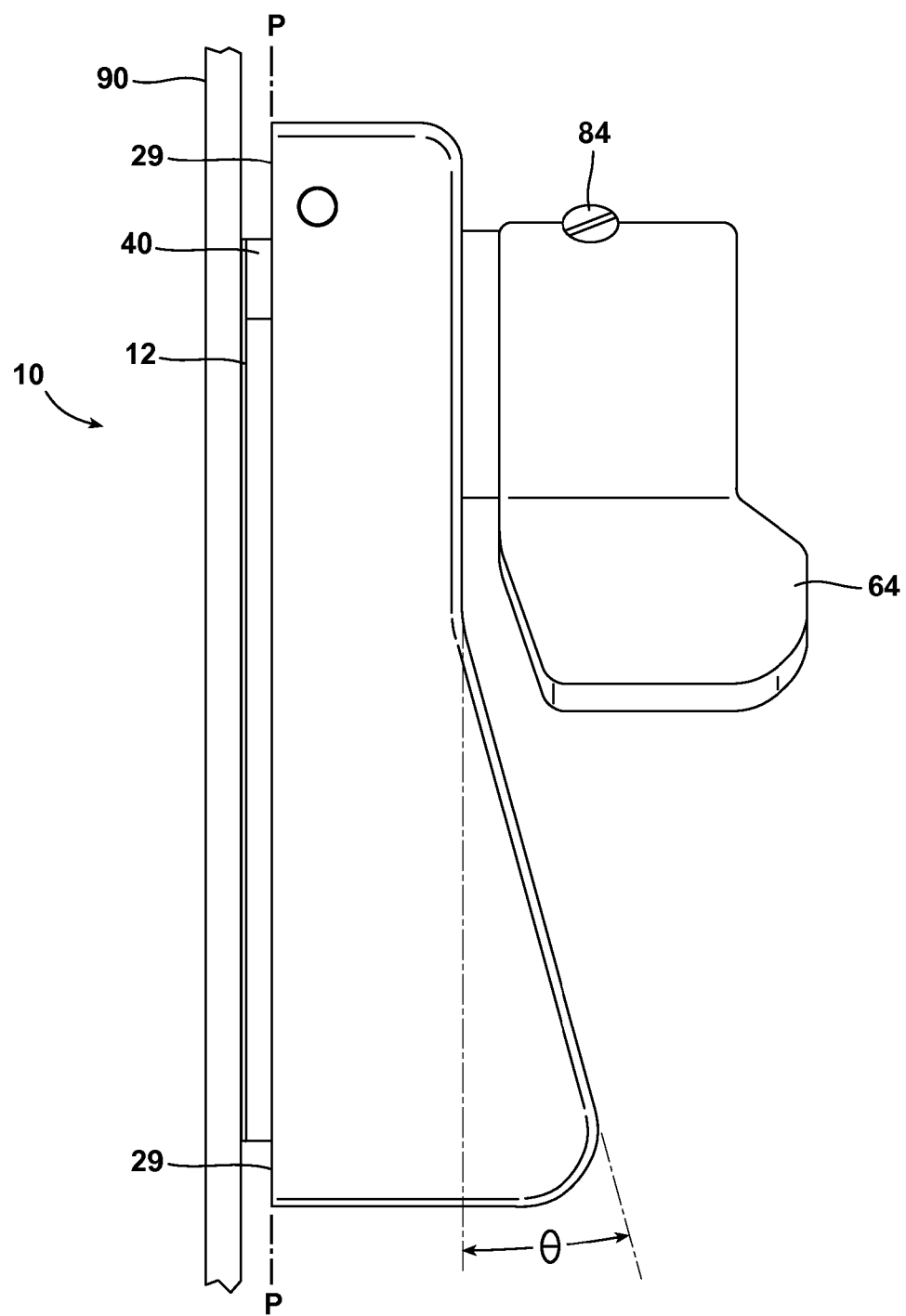
FIG. 6 is a side elevational view of the transponder holder showing the transponder in the first position.
Figure 7:
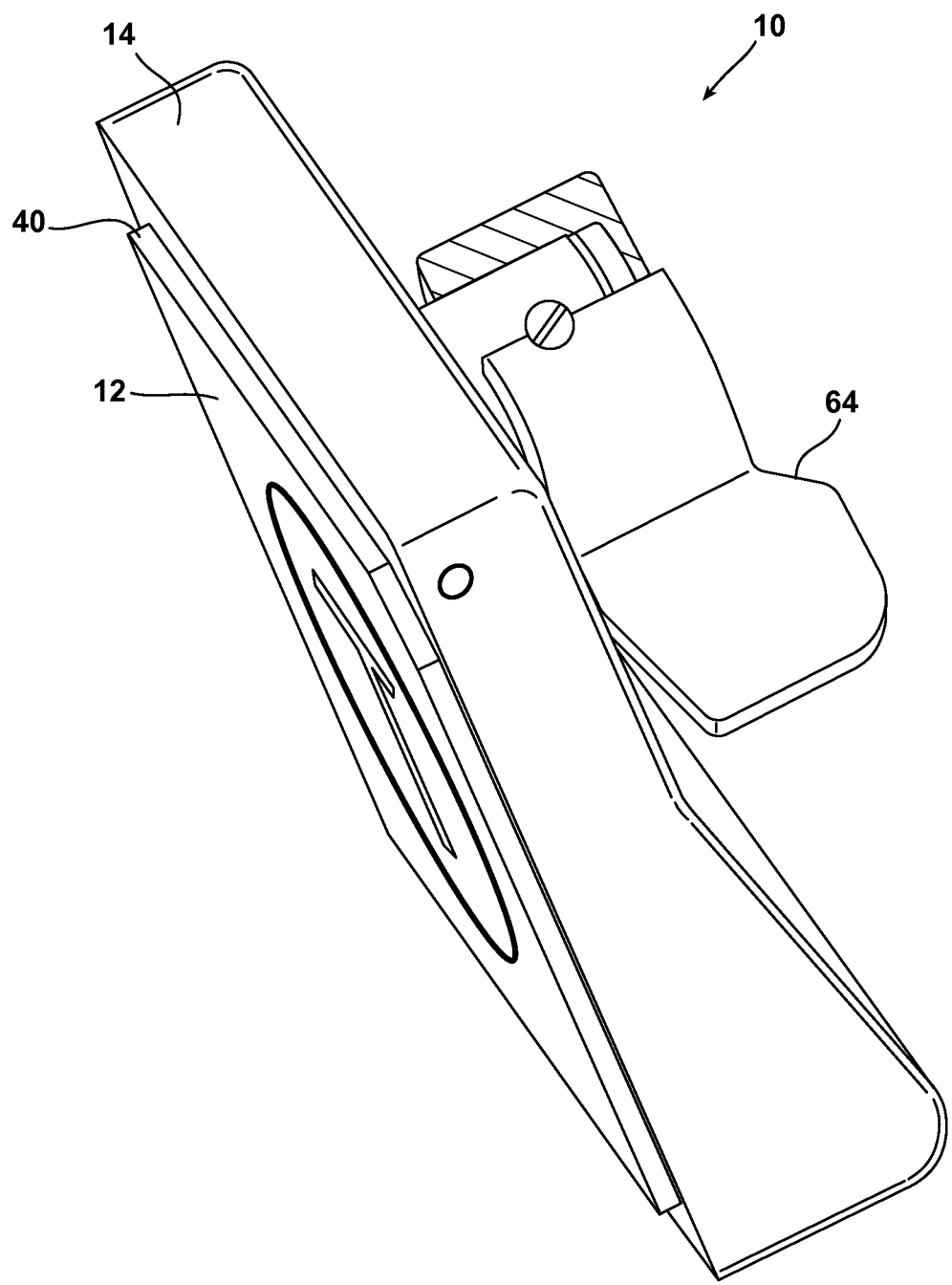
FIG. 7 is a side perspective view of the transponder holder showing the transponder in the first position.

Mounting plate 30 provides a surface upon which the transponder 12 may be secured. The plate 30 may have dimensions substantially similar to that of the transponder. An adhesive layer 40 may be interposed between the transponder 12 and the plate 30 to secure the transponder thereto. The adhesive layer 40 may include a thin resilient material. Accordingly, the transponder 12 moves with the plate 30 between the first and second positions. The adhesive layer 40 may extend from the mounting plate 30 so that the transponder 12 is held beyond the front face 29 in the first position as shown in FIGS. 6 and 7. When holder 10 is mounted to a vehicle windshield the transponder 12 is held against the windshield in a manner described below.

Movement of the mounting plate 30 between the first and second positions is controlled by an actuator 50. The actuator 50 may include an actuating member 52 operably connected to the mounting plate 30. The actuating member 52 may include an abutment end 54 and a head 55. Actuating member 52 abutment end 54 may extend through an aperture 56 formed in the back wall first portion 18 and into the housing interior 28. Abutment end 54 engages the back surface of the mounting plate 30. Mounting plate 30 may include a slot 58 formed therein which receives a securement member 60. The securement member 60 extends through the slot 58 and couples to the actuating member abutment end 54. Translational movement of the actuating member 52 causes the mounting plate 30 to pivot.

With specific reference to FIG. 2-3, movement of the actuating member 52 may be caused by rotation of a knob 64 (e.g., a user engagement member). Knob 64 includes a body 66 defining an interior 68, and a lever 70 may project outwardly from the body 66 in a radial direction. The knob interior 68 receives the actuating member head 55. A projection 72 extends from the back wall first portion 18. The projection 72 may have a generally round sidewall 74 defining the aperture 56 extending through the back wall of the housing 14. A sleeve 78 may extend over the sidewall 74. The actuating member 52 extends through aperture 56 and the head 55 is disposed within the knob interior 68. A biasing device 76 may extend into the aperture 56 and engage an undersurface of an actuating member head 55. The biasing device tends to urge the actuating member 52 away from the housing interior 28.

The knob 64 is selectively moveable toward and away from the back wall in order to urge the actuating member 52 into the housing interior. The actuating member 52 when urged into the housing interior 28 engages the back surface of the mounting plate 30 and drives the plate 30 toward the first position wherein the transponder 12 extends proximate to, generally flush with, or beyond the housing front face 29 as shown in FIG. 6.

Figure 9:
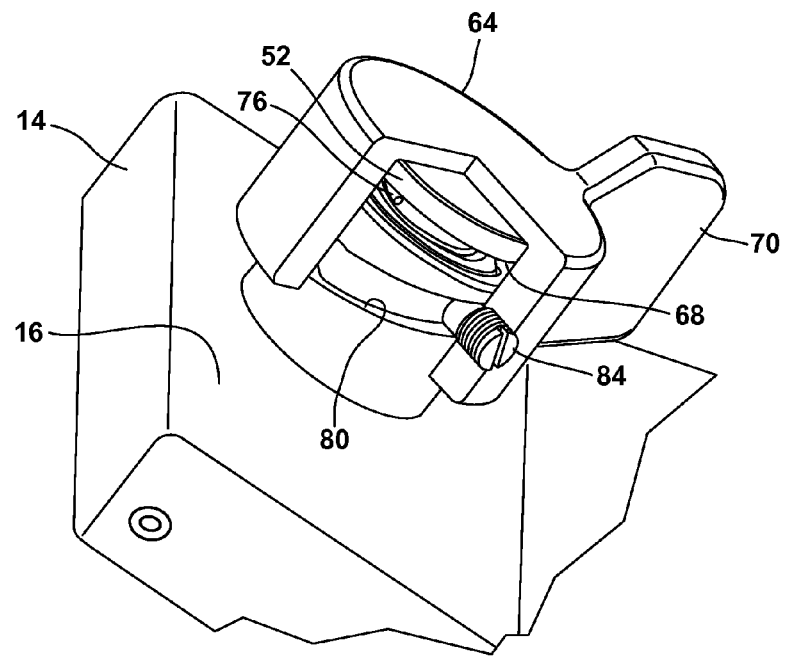
FIG. 9 is a detail view of the actuator with a portion of a knob cut away showing an actuating member in a first position.
Figure 10:
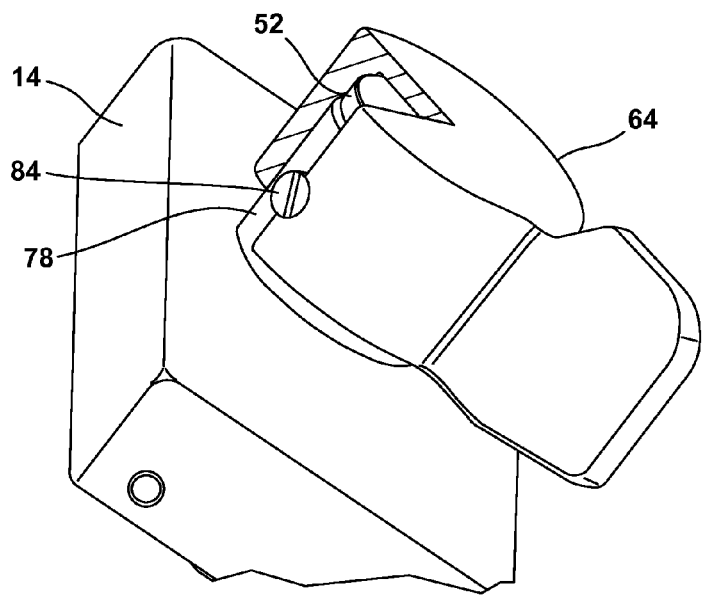
FIG. 10 is a detail view of the actuator with a portion of a knob cut away showing an actuating member in a second position.
Figure 11:
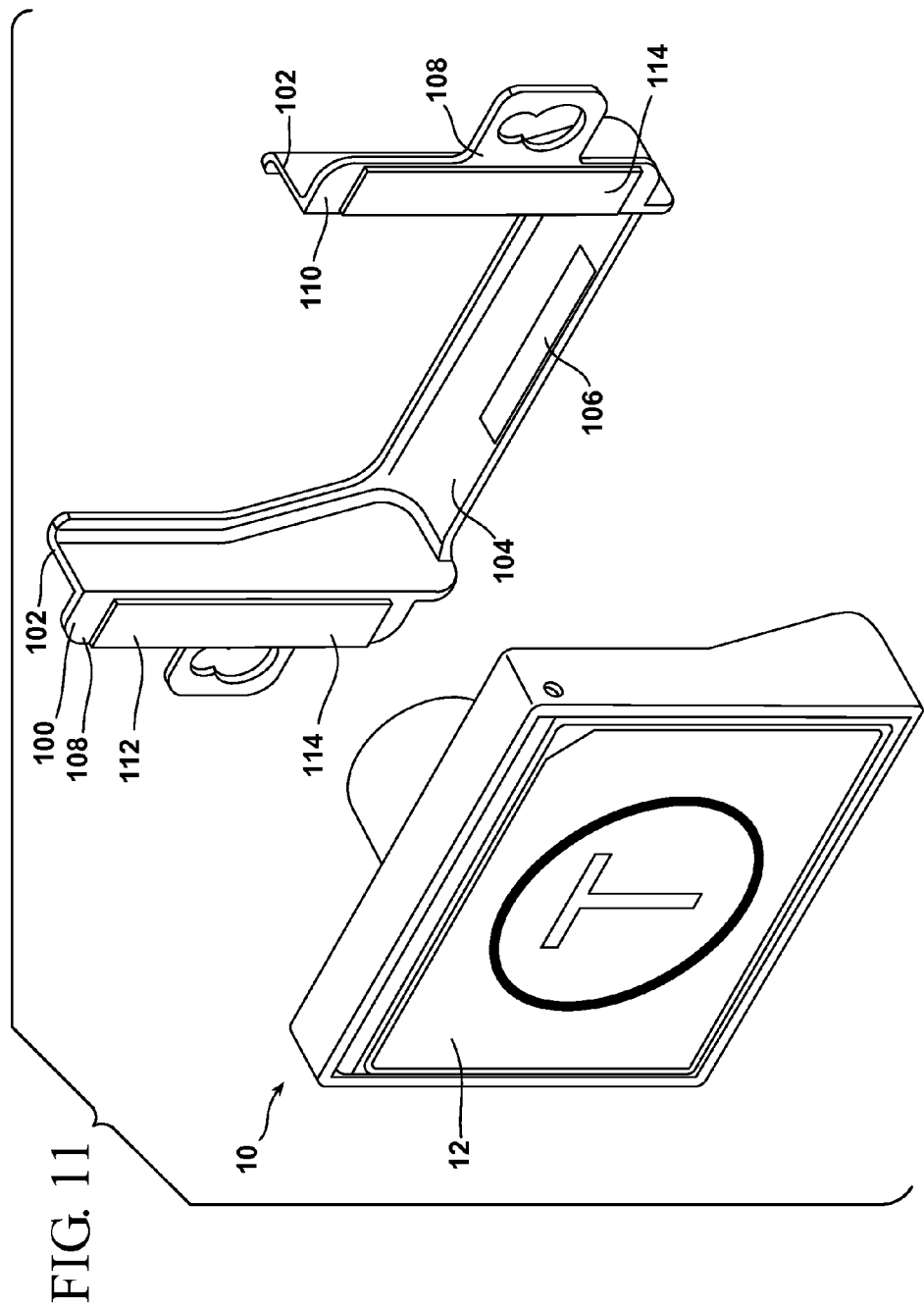
FIG. 11 is a perspective view of the transponder holder and a bracket.
Figure 12:
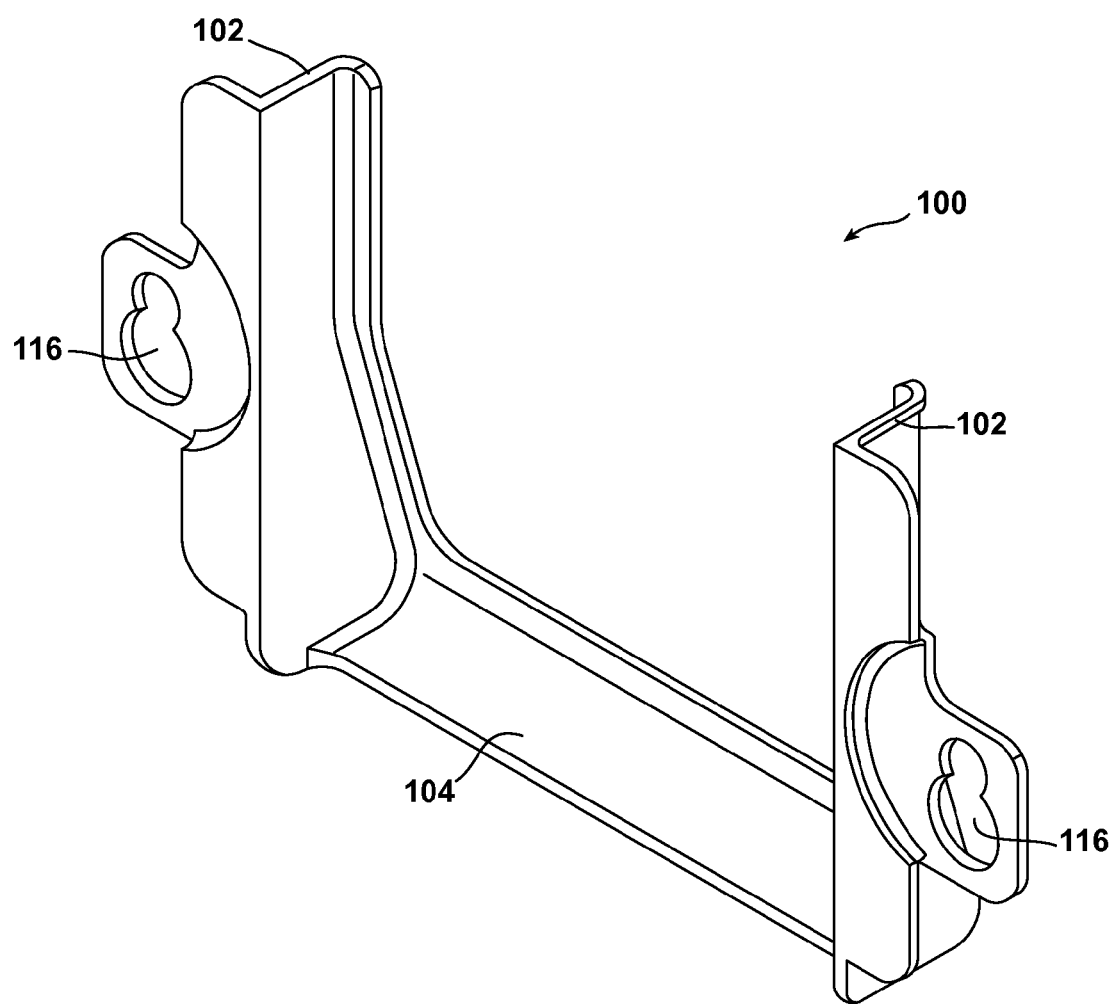
FIG. 12 is a perspective view of the bracket.
Figure 13:
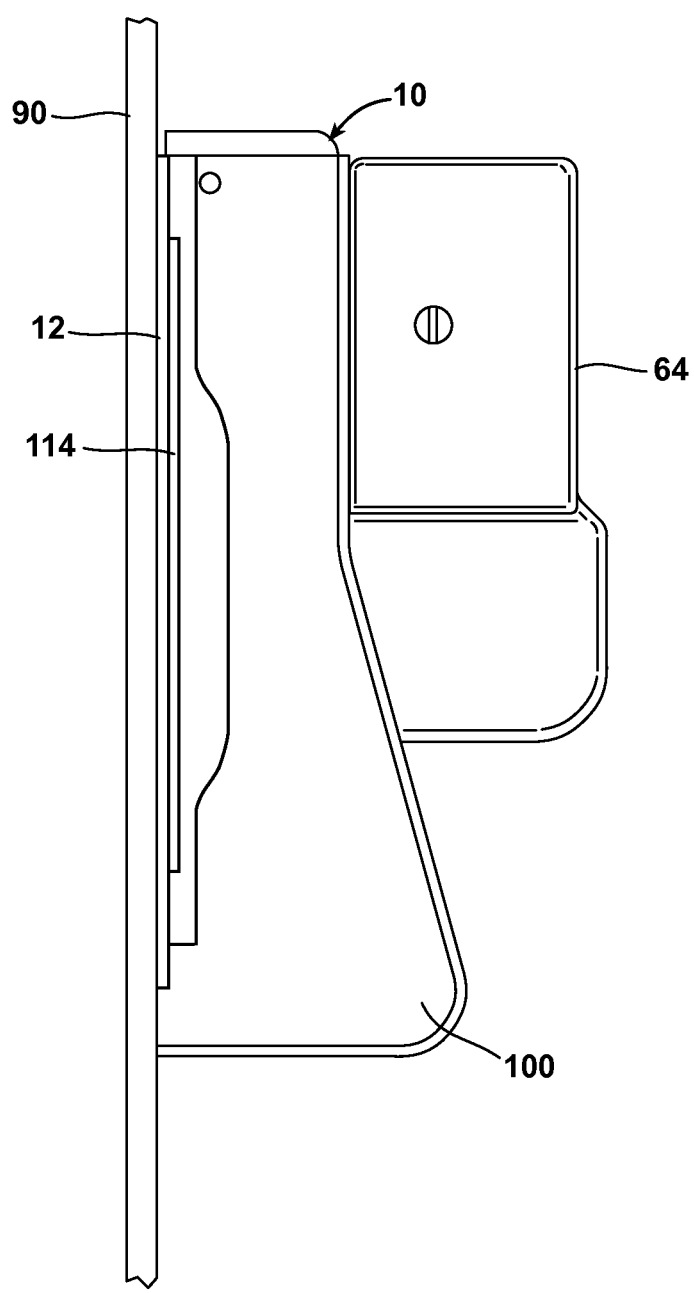
FIG. 13 is a side elevational view of the transponder holder in the bracket.
Figure 14:
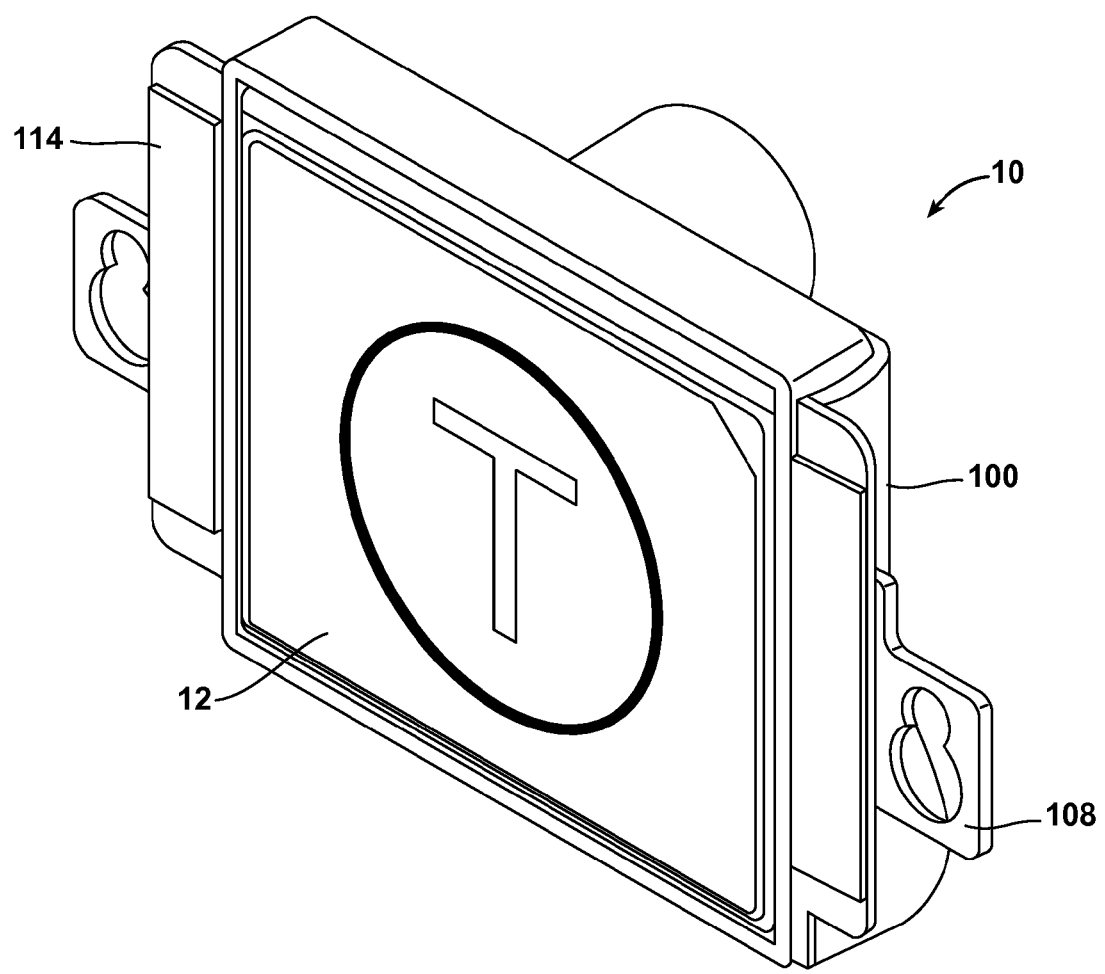
FIG. 14 is a front perspective view of the transponder holder in the bracket.
Figure 15:
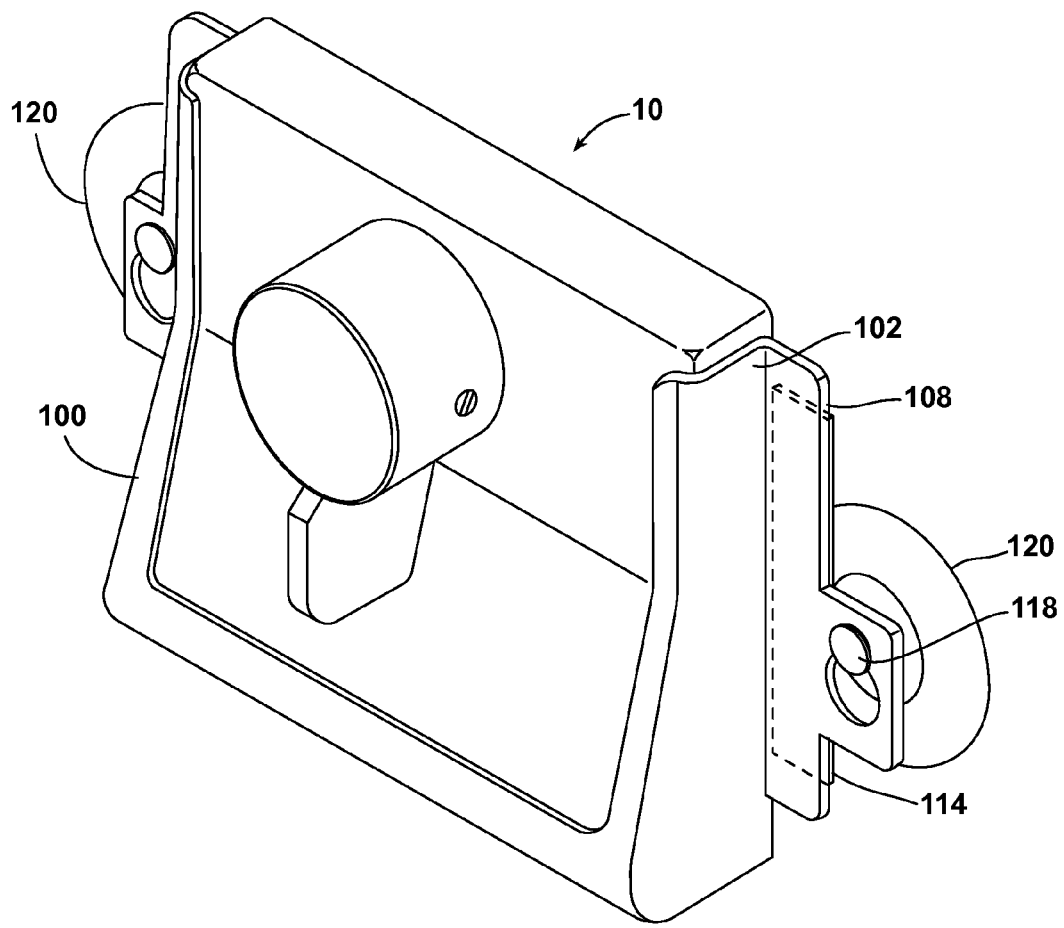
FIG. 15 is a rear perspective view of the transponder holder in the bracket.
Figure 16:
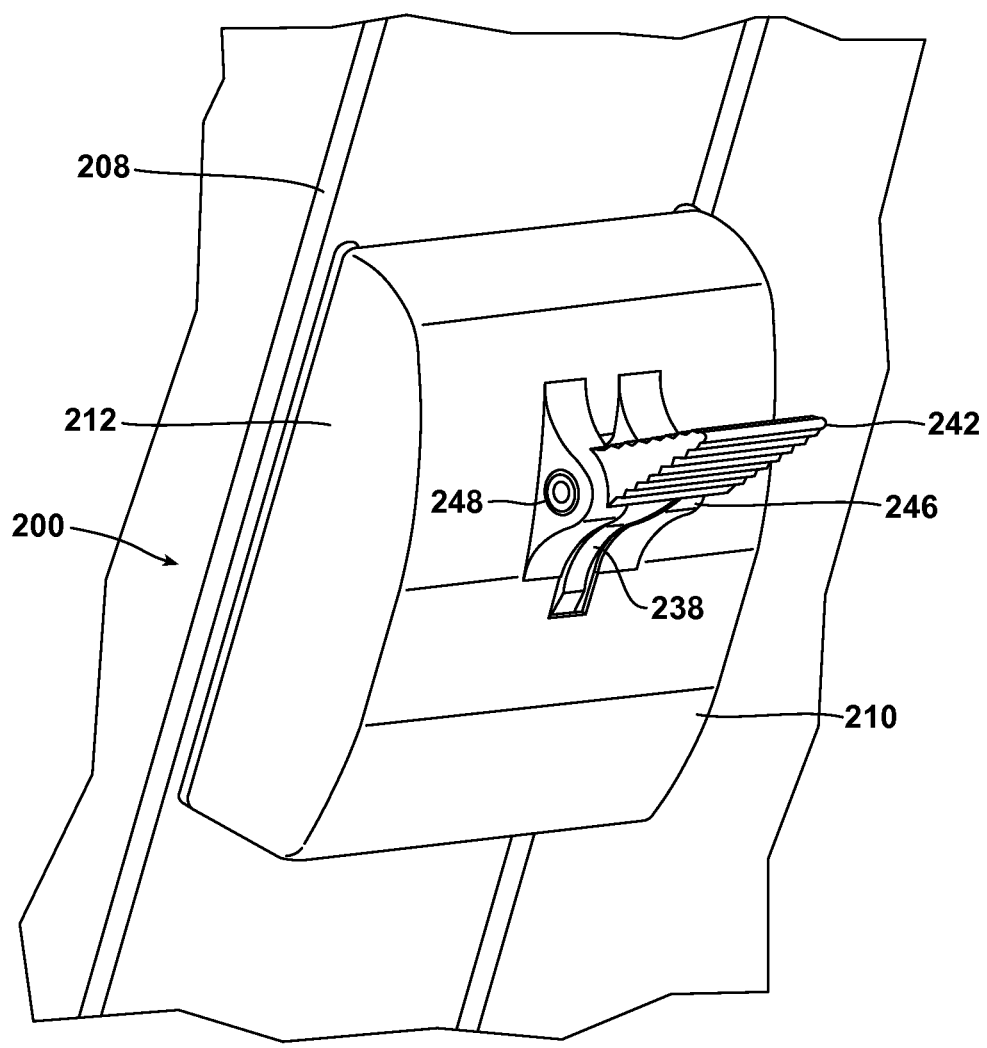
FIG. 16 is a perspective view of an alternative embodiment of a transponder holder of the present invention.
Figure 17:
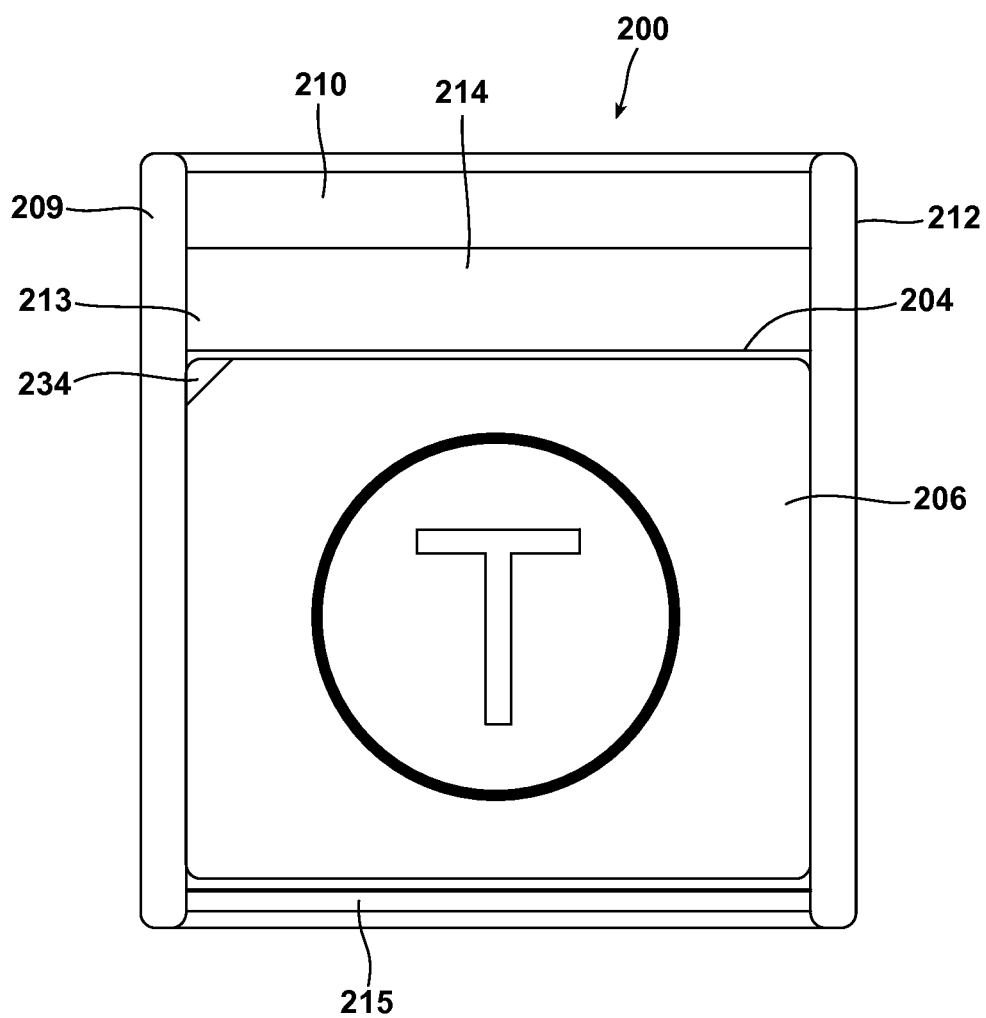
FIG. 17 is a front elevational view of the transponder holder including a sticker tag.

The sleeve 78 disposed around projection 72 may include one or more ramped grooves 80 partially extending around the circumference of the sleeve. The grooves 80 are generally helical and tend to gradually slope in an axial direction. The knob 64 may include a pair of opposed openings 82. Pins 84 may extend through the openings 82 and into the grooves 80. The pins 84 may be secured to the knob 64 such as by a threaded fastening. Rotation of the knob 64 by a user of the transponder holder 10 causes the pins to ride within the groove whereby the knob 64 translates as it rotates. The translating knob 64 causes the actuating member 52 to move. The knob 64 may be turned in one direction in which the actuating member 52 extends further into the housing interior, thereby moving the plate and the transponder 12 attached thereto to the first position, wherein the transponder 12 is readable. (FIG. 10) Rotation of the knob 64 in the opposite direction tends to move the knob 64 away from the back wall 16 (FIG. 9). Under the action of the biasing device 76 the actuating member 52 moves away from the housing interior 28 thereby pivoting the mounting plate 30, and the transponder 12 mounted thereto, into the housing interior 28 and away from the housing front face 29, such that the transponder 12 would not be readable. Accordingly, a user can easily move the transponder between a readable and non-readable position by simply rotating the knob 64.

While an actuator including a knob is described, it is within the contemplation of the present invention that the plate 30 may be moved between the first and second positions by various other actuation devices such as levers, push buttons, or the like.

The transponder holder 10 may be mounted on a vehicle such as on the windshield 90. When an operator of the vehicle desires for the transponder 12 to be interrogated by an outside system, they may rotate the knob 64 moving the plate 30 and transponder 12 into contact with the windshield 90. (FIG. 6). With the transponder against the windshield 90, it may easily be read by an interrogator such as that used by an automated toll system. Such systems typically require the front face of the transponder 12a to be in contact with the windshield 90 in order for it to be read by the interrogator. (FIG. 6). Accordingly, if a user desires that the transponder 12 not be interrogated by the outside system, the user may rotate the knob 64 in the opposite direction to permit the transponder 12 to pivot away from the windshield into the housing interior 28. In this position shown in FIG. 8, the transponder 12 is moved away from the windshield and a space 91 is created between the transponder 12 and the windshield 90. Therefore, the transponder 12 will not be read by an interrogator toll system, or the like. Indicia 92 (FIG. 3) may be disposed on the housing back wall 16 to advise a user as to whether the transponder is in the first operable position or second inoperable position. Accordingly, the present invention permits a user to selectively render the transponder operable or inoperable as desired. For example, if a user does not what to use the transponder 12 to pay a toll in an automated toll system, the user may render the transponder unreadable and pay the toll manually.

The transponder holder 10 may be secured to a windshield by adhesive strips 96 disposed on the front face of the housing 29 as shown in FIG. 4. The strips have a thickness such that when the mounting plate 30 is moved into the first position the transponder 12 engages the windshield rendering the transponder readable by an outside interrogator. If the user desired to move the transponder 12 to another vehicle, they can remove the transponder holder 10 from the windshield without damaging the transponder.

Alternatively, the transponder holder 10 may be secured to a structure such as a windshield via a bracket 100. With reference to FIGS. 11-15, bracket 100 may include two end walls 102 separated by a connecting member 104. The end walls 102 may have a similar configuration to the housing sidewalls 22, and the connecting member 104 may have a configuration similar to the housing bottom wall 26. Accordingly, the transponder holder 10 may sit within the bracket 100 and may be held there by an interference-type fit and/or by an adhesive strip 106. The transponder holder 10 may be secured to the bracket 100 such that it may be selectively removed and replaced into the bracket with the bracket remaining on the windshield.

The bracket 100 may be attached to the inner surface of the windshield structure 90 via flanges 108 extending outwardly from the end walls 102. The flanges 108 may provide a surface 110 in which two securement devices 112 are attached. The securement devices attach the bracket to a vehicle's windshield 90. The securement devices 112 may include adhesive members 114 and or hook and loop-type fasteners. Alternatively, or in addition to, the flanges 108 may include openings 116 there-through in order to permit a lug 118 on the back of a suction cup 120 to extend into and be retained therein. Accordingly, the bracket 100 may be attached to a structure via one or more suction cups 120. The bracket 100 and transponder holder 10 may easily be moved to another vehicle without damaging the transponder 12.

Figure 18:
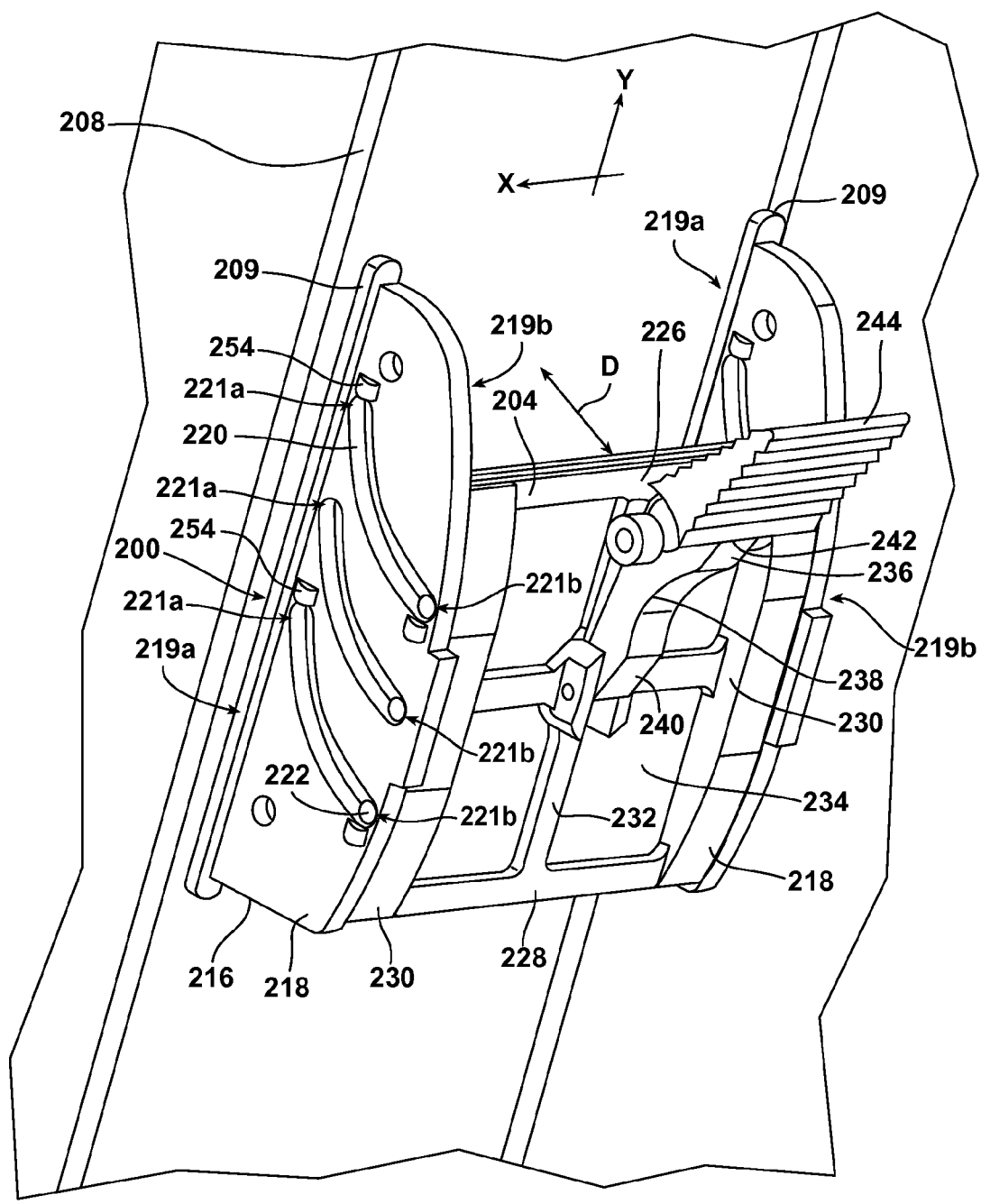
FIG. 18 is a perspective view of the transponder holder attached to a support surface with the body removed showing the transponder spaced a distance from the support surface.

With reference to FIGS. 16-19, an alternative embodiment of the transponder holder is shown therein. Transponder holder 200 includes a housing 202 having a movable mounting plate 204 for supporting a transponder 206 thereon. The transponder 206 may be in the form of a sticker tag or the like. The holder 200 may be secured to a support surface 208 such as the windshield of a motor vehicle. In one embodiment, the transponder holder 200 may be fixedly secured to a support surface 208 by a pair of adhesive strips 209. With specific reference to FIGS. 18 and 19, the mounting plate 204 is movable between a first position (FIG. 19) wherein the mounting surface is positioned proximate and/or adjacent the support surface 208 and a second position wherein it is spaced a distance D from the support 208 surface (FIG. 18). In some embodiments, when the mounting plate 204 is in the first position, the mount plate 204 can engage the support structure. Movement of the mounting plate 204, and transponder 206 secured thereto, selectively renders the transponder readable and not readable by an interrogator.

The housing 202 may include a back wall 210 bounded by two opposed side walls 212. The back and side walls form a housing interior 214 having a cavity 213 in which the mounting plate 204 is disposed. The housing 202 includes a front face 215 which is positioned adjacent the support structure 208. The housing interior 214 also includes a mounting plate support 216 which includes a pair of spaced guide members 218 having a front end 219a and a back end 219b. The members 218 can be secured to the housing sides walls 212. Each of the members 218 includes a plurality of arcuate shaped slots 220 formed therein having front ends 221a and back ends 221b. The mounting plate 204 includes a plurality of pins 222 extending outwardly from sides thereof. The pins 222 are received within the slots 220 and slide freely therein. The cooperation between the pins 222 and slots 220 permits the mounting plate 204, and the transponder 206 secured thereto to move toward and away from the housing front face 215. The housing and mounting plate may be formed of a molded plastic or other similar material.

Figure 19:
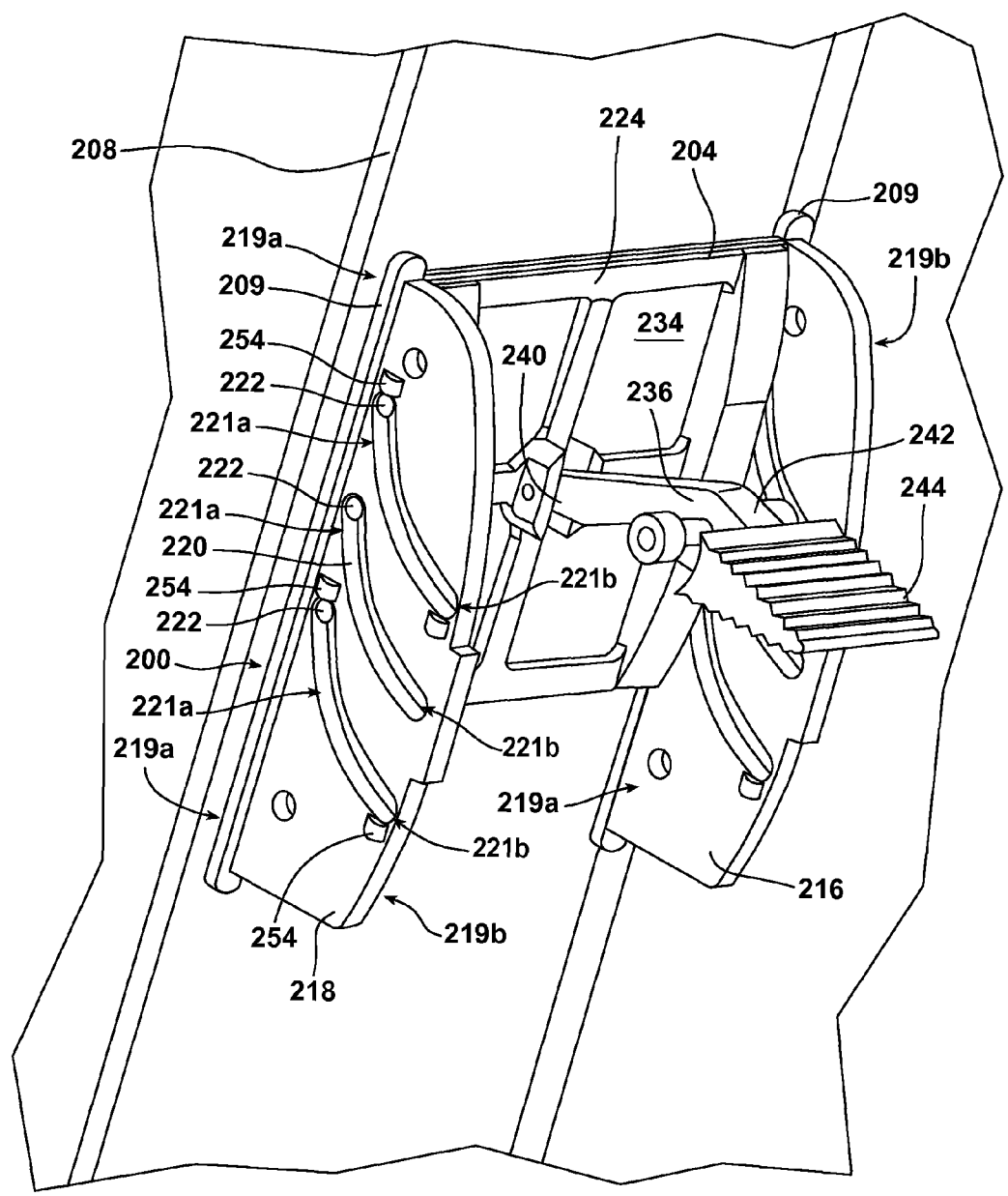
FIG. 19 is a perspective view showing the transponder engaging the support surface.

With reference to FIGS. 18 and 19, the mounting plate 204 may be in the form of a frame-like structure having outer frame elements 224 including a top 226 and bottom 228 member and opposed side members 230. The pins 222 extend from the side members. The outer frame elements may be connected by inner frame elements 232 which may have a cross-shaped configuration. It is within the contemplation of the present invention that the support plate 204 could have different configurations including a solid member.

The transponder 206 may be secured to the mounting plate 204 by an adhesive layer 234. The adhesive layer 234, for example, may be in the form of double sided foam tape which extends over the outer and inner frame elements and covers up openings formed by the frame elements 224, 232. The foam provides a resilient backing to the transponder 206 such that the transponder 206 can be urged and held into contact with the support surface. The adhesive layer 234 may have a thickness such that then the transponder 206 is secured thereto, the transponder extends proximate to, generally flush with, or beyond the housing front face 215 such that the transponder 206 is positioned in proximate to the support surface and is readable by the interrogator. In some embodiments, the mounting plate and/or the transponder can be positioned to fully engage the support surface 208.

The transponder holder 200 may include an actuating device 236 for permitting a user to move the transponder 206 between the first and second positions. The actuating device 236 may include a ridged arm 238 having a first end 240 pivotally secured to the center of the back portion of the mounting plate 204 as shown in FIGS. 18 and 19. An arm second end 242 may include a user engagable tab 244 (e.g., user engagement member) which allows a user to pivot the arm 238. With additional reference to FIG. 16, the housing 202 may include two raised portions 246 spaced from each other which allow the arm 238 to extend therebetween. The raised portions 246 include an opening 248 for receiving a fastener 250 which extends through the raised portions 246 and through the arm, thereby pivotally securing the arm 238 to the housing 202. The connection creates a pivot point about which the arm 238 rotates. Pivoting of the arm 238 causes the mounting plate 204 to move along a path defined by the slots 220. Due to the arcuate shape of the slots 220, the mounting plate 204 tends to move in two axes, one axis, y, is generally vertical and the other axis, x, (FIG. 18) is in the direction toward and away from the support surface 208. Furthermore, the orientation of the mounting plate remains generally unchanged when the plate is moved between the first and second position. As one example, the front face 215 of the housing can reside on a first plane and the mounting plate can reside on second and third planes that are substantially parallel to the plane formed by the housing front face 215 when the mounting plate is in the first and second positions, respectively. In some embodiments, the first and second planes are identical such that the plate resides on the first plane when the plate is in the first position.

As shown in FIG. 18, the tab 244 may be pivoted by a user to a first position. As the tab 244 pivots, arm 238 moves the mounting plate guided by the slots 220 such that the mounting plate 204 is proximate to, generally flush with, or extends beyond the housing front face 215 and the transponder 206 is positioned proximate to the support surface so that the transponder 206 is readable by an interrogator. In some embodiments, the transponder 206 engages and is pressed against the support surface in the first position.

If a user wishes to render the transponder 206 unreadable by such an interrogator, the user can pivot the tab 244 to a second position. In response, the mounting plate is then moved to the second position such that it is spaced a distance D away from the support surface 208 as shown in FIG. 18. In this position, the mounting plate and transponder secured thereto are moved away from the housing front face 215 and recessed into the housing interior 214. The transponder 206 would be unreadable by an interrogator of a toll system in the second position. Accordingly, a user may render the transponder readable or non-readable by simply flipping tab 244 between the first and second positions. Indicia, such as the words "ON" and "OFF" may be included on the housing adjacent the tab 244 to alert the user as to whether the transponder is readable or not.

In order to help maintain the mounting plate 204 in either the first or second positions, the ends 252 of one or more of the arcuate slots may include a retaining member 254 therein. In one embodiment, the retaining member 254 may include a magnet located at either slot end 252. The pins 222 extending from the mounting plate 204 may be formed of a ferromagnetic material such that when a pin is brought toward the end of the slot the magnet will attract the pin and help to maintain it in that position. In the embodiment shown in FIG. 19, two of the slots include magnets at either end. However, it is within the contemplation of the present invention that one or all of the slots may include such retaining members.

Figure 20:
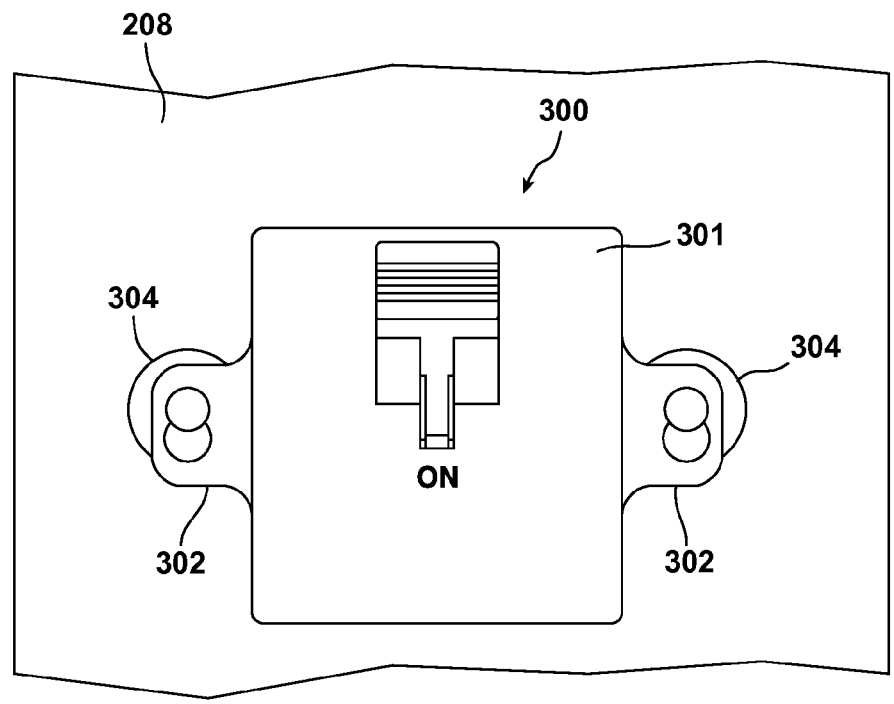
FIG. 20 is a top plan view showing an alternative embodiment of the transponder holder housing.
Figure 21:
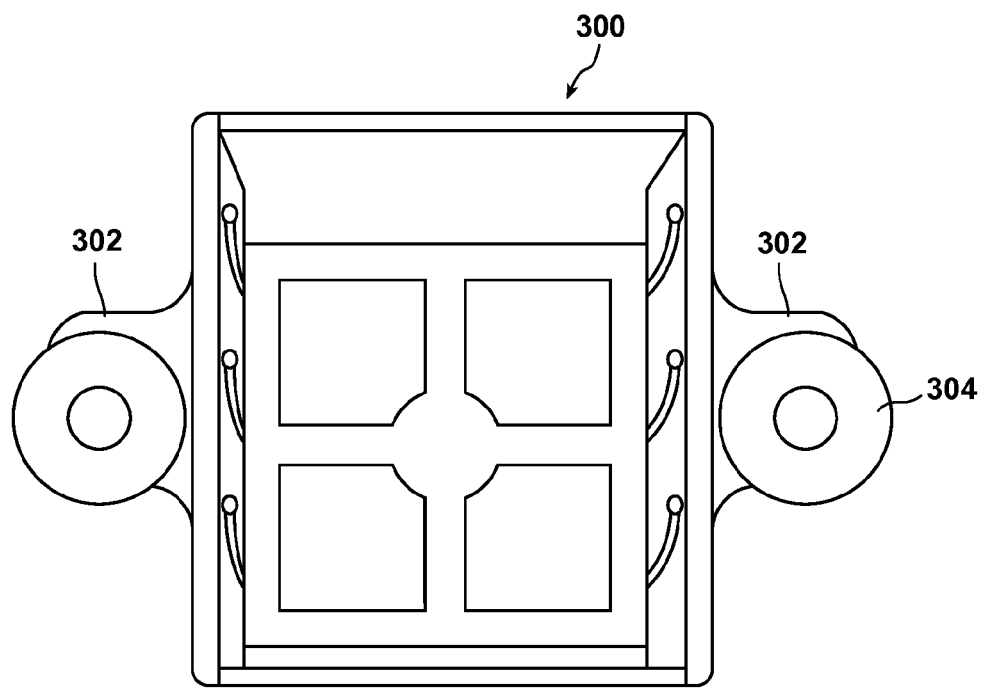
FIG. 21 is a front elevational view of the transponder holder of FIG. 20.

With reference to FIGS. 20 and 21, a further alternative embodiment of the present invention is shown. In this is embodiment the transponder holder 300 is the same as that described in FIGS. 16-19 except the housing 301 may differ and include a pair of flanges 302 extending outward in order to secure a pair of suction cups 304. As shown in FIG. 20, the transponder holder may therefore be secured to the support surface 208 by way of the suction cups 304. The holder 300 and transponder attached thereto can easily be moved from one vehicle to another by simply detaching the suction cups from the windshield of one vehicle and reattaching the transponder holder to the windshield of another vehicle. If is also within the contemplation of the present invention that other devices may be used to secure the holder 300 to a support surface, such as hook and loop-type fasteners.

Figure 22:
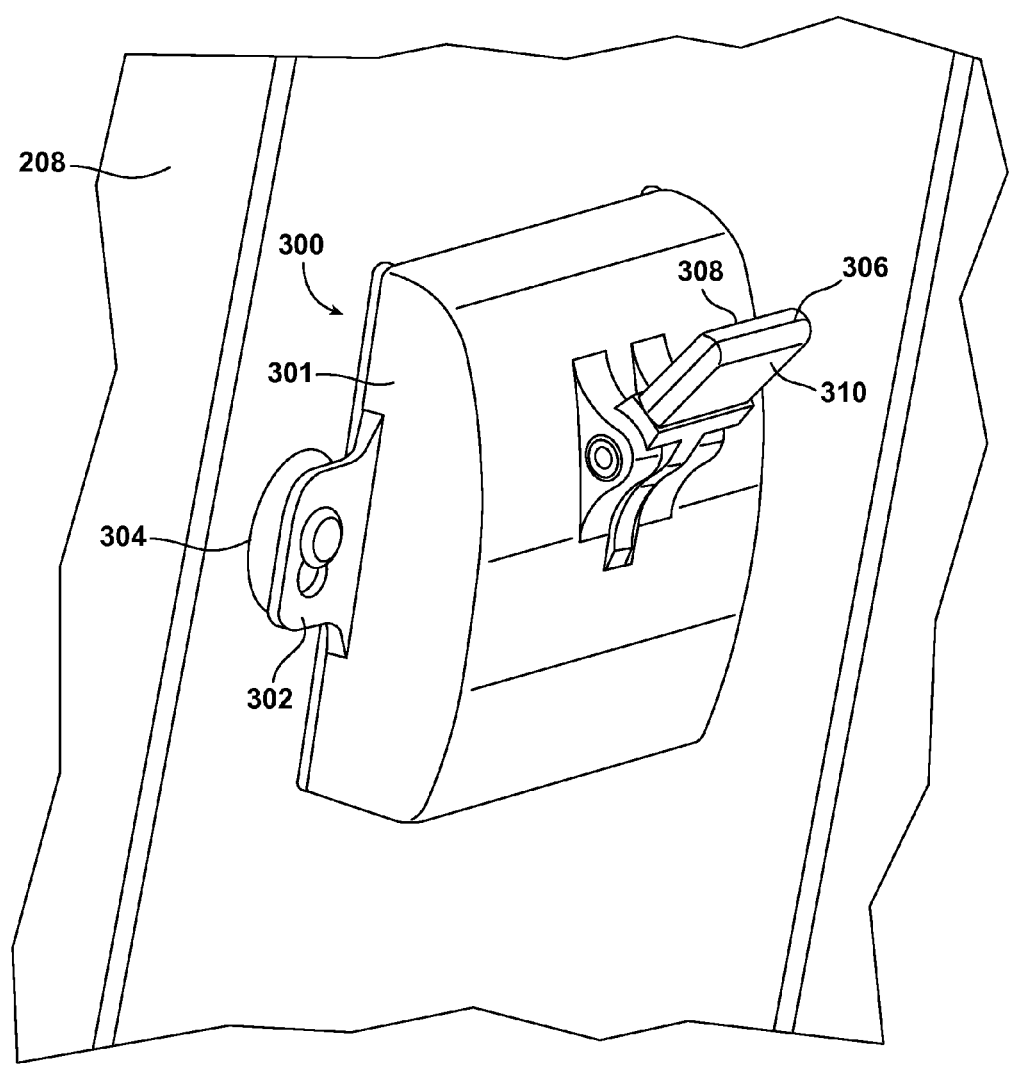
FIG. 22 is a perspective view showing a further alternative embodiment of the transponder holder attached to a surface.
Figure 23:
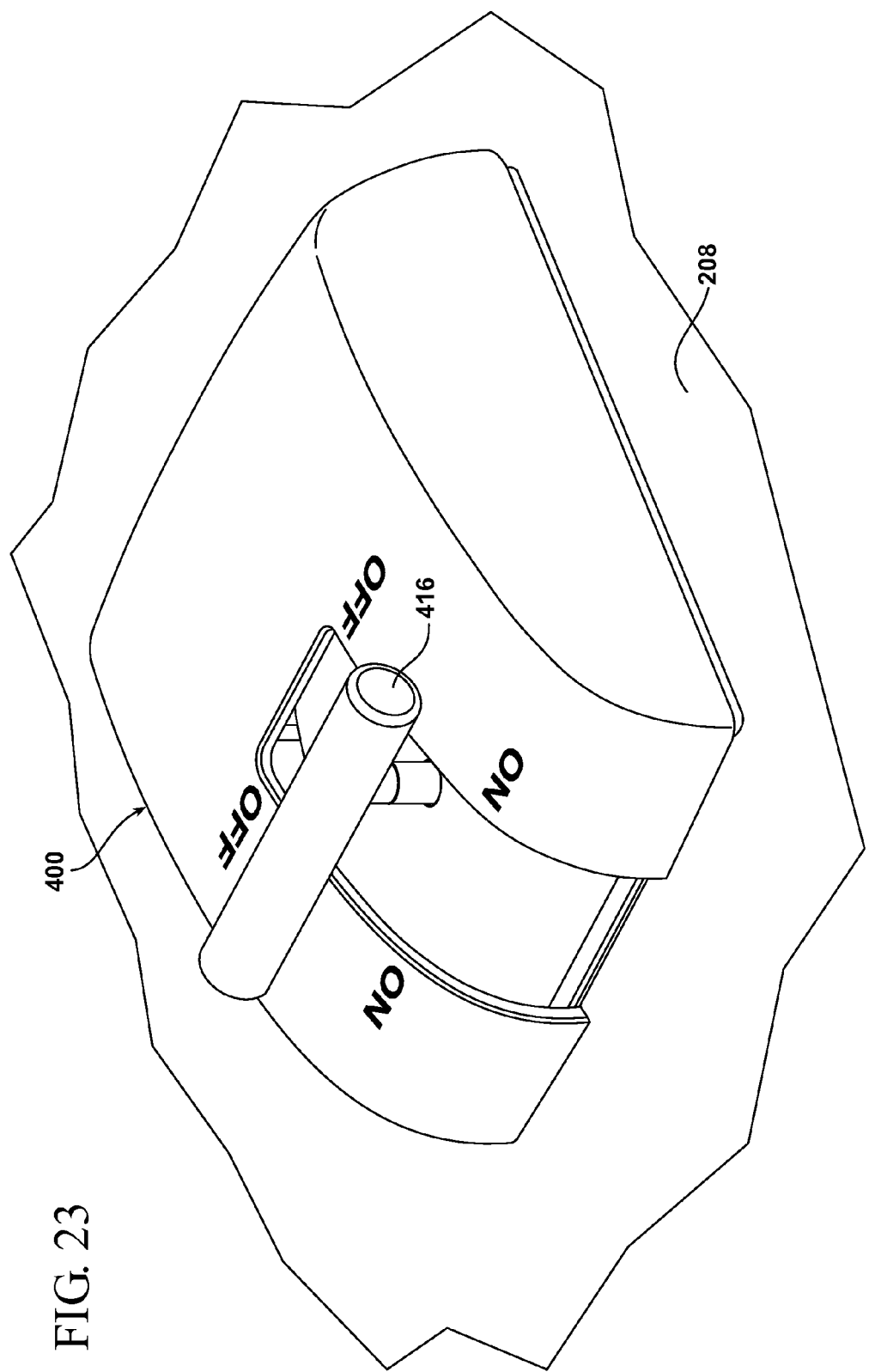
FIG. 23 is a perspective view of a further alternative embodiment of the transponder holder.
Figure 24:
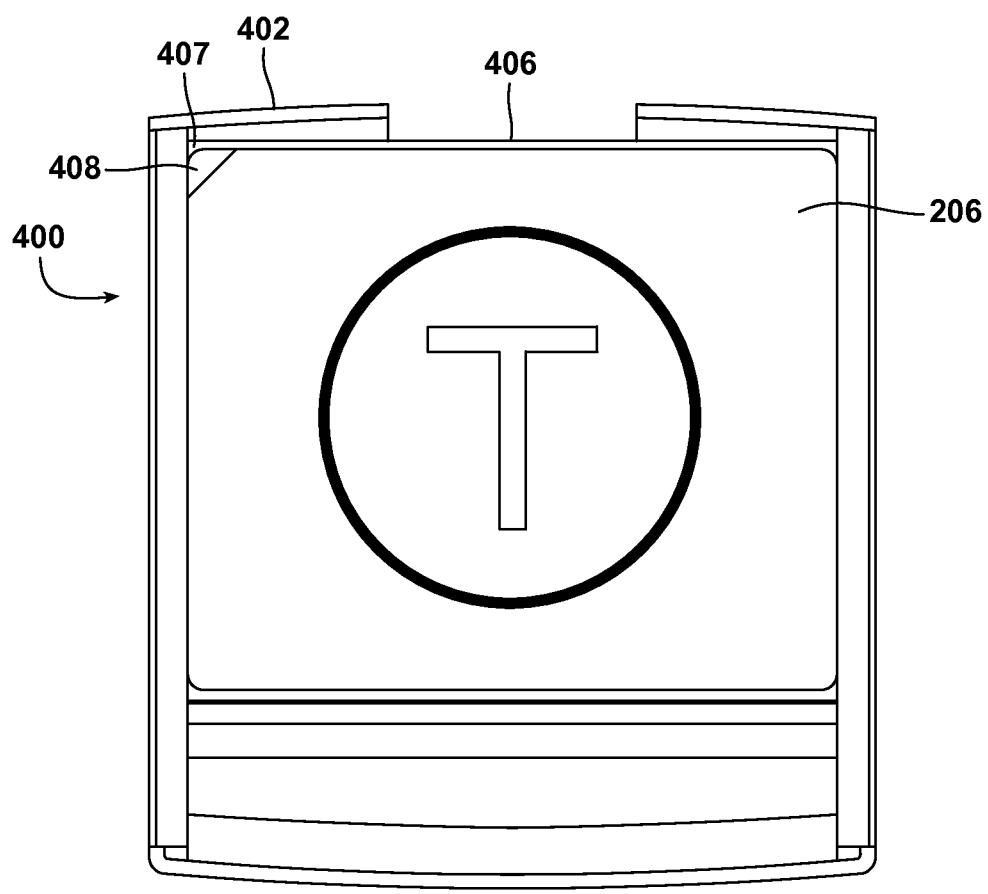
FIG. 24 is a front elevational view of the transponder holder showing a sticker tag attached thereto.
Figure 25:
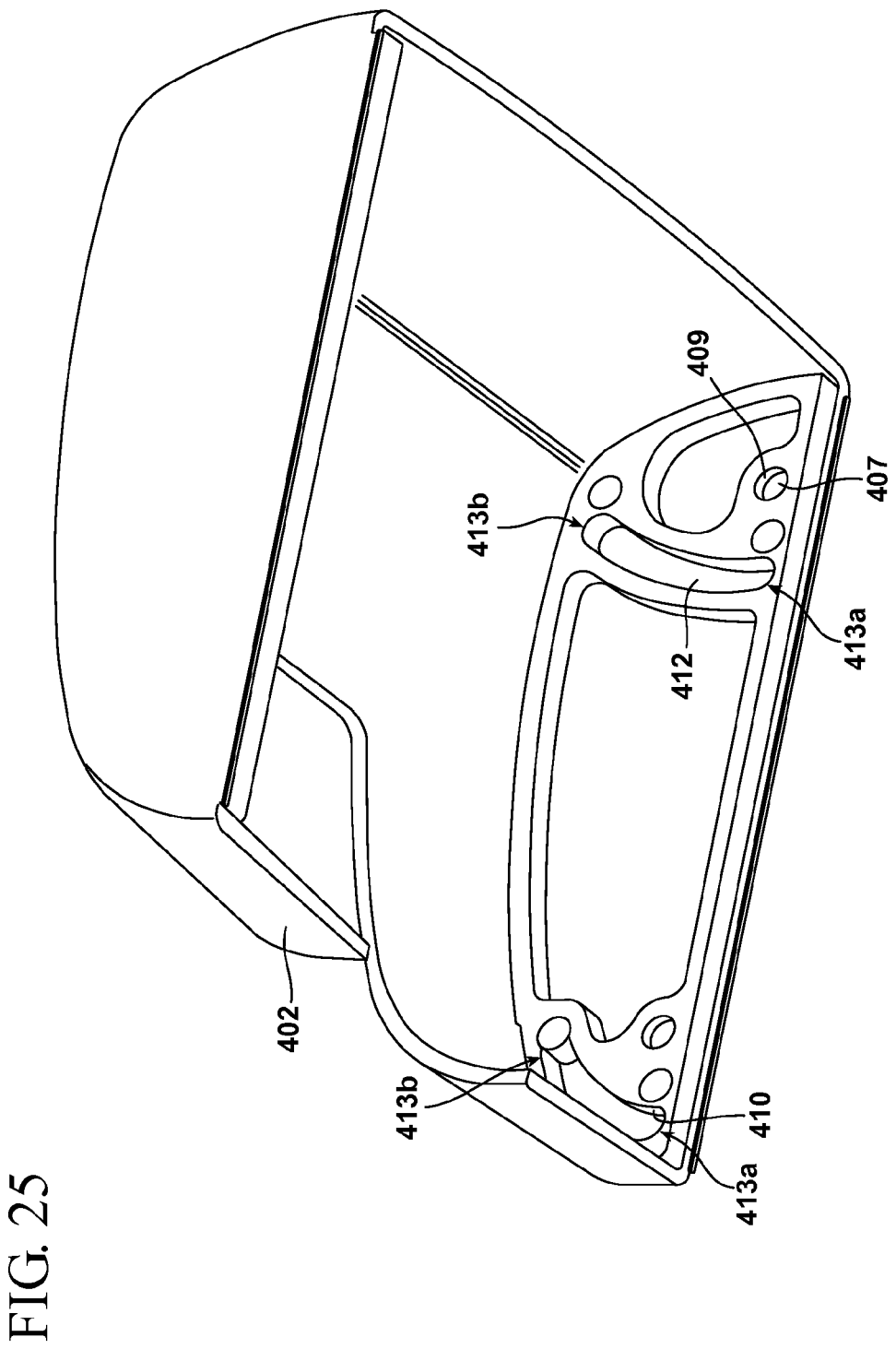
FIG. 25 is a perspective view of the cover including a portion of the frame therein.

In another embodiment shown in FIG. 22, the tab 306 which is engaged by the user may have a top surface 308 including one indicia and the bottom surface 310 including a second indicia. The top surface 308 may be easily viewed by a user then the tab is in one position, and the bottom surface 310 is easily viewed when the tab is in the other position. For example, the top surface may be green indicated that the transponder is "on" or readable, and the bottom surface may be red indicating that the transponder is "off" or not readable.

Still a further embodiment of the present invention is shown in FIG. 23-27. As in the previously described embodiments shown in FIGS. 16-22, the transponder holder 400 may include a housing 402 having an interior 404 in which a movable transponder mounting plate 406 is disposed. The mounting plate may include a mounting surface 407 upon which the transponder 206 such as a sticker tag may be secured. The securement of it may be effected by a piece of double sided adhesive foam 408. The mounting plate 406 can be moved between a first and second position to selectively render the transponder readable and non-readable.

With reference to FIGS. 23-27, the mounting plate 406 is operably connected to a pair of spaced members 410 having a front end 411a and a back end 411b. The housing 402 may include a plurality of studs 407 extending outwardly which engage complimentary apertures 409 formed in the end members to secure the members 410 to the side of the housing. The members 410 each include a pair of arcuate shaped slots 412 formed therein having front ends 413a and back ends 413b. The slots 412 receive pins 414 extending outwardly from the four corners of the mounting plate 406. As the pins ride within the slots, the mounting plate may move toward and away from the support surface 208 such as a windshield of a car. This movement is initiated by a user engaging an actuating handle 416 connected to the back side of the mounting plate. The housing 402 may include a wide slot 417 in order to provide clearance for the handle 416 to move. Pushing the handle 416 forward and towards the support surface moves the mounting plate 406 and transponder secured thereto toward the mounting surface, thereby making the transponder 206 readable. The handle 416 may then be pulled generally away from the support surface such that the pins 414 ride in the slots 412 which go upward and the mounting plate is moved away from the support surface. The arcuate slots are generally aligned in a vertical orientation such that the mounting plate will move away from or toward the mounting surface upon moving the handle 416.

Figure 26:
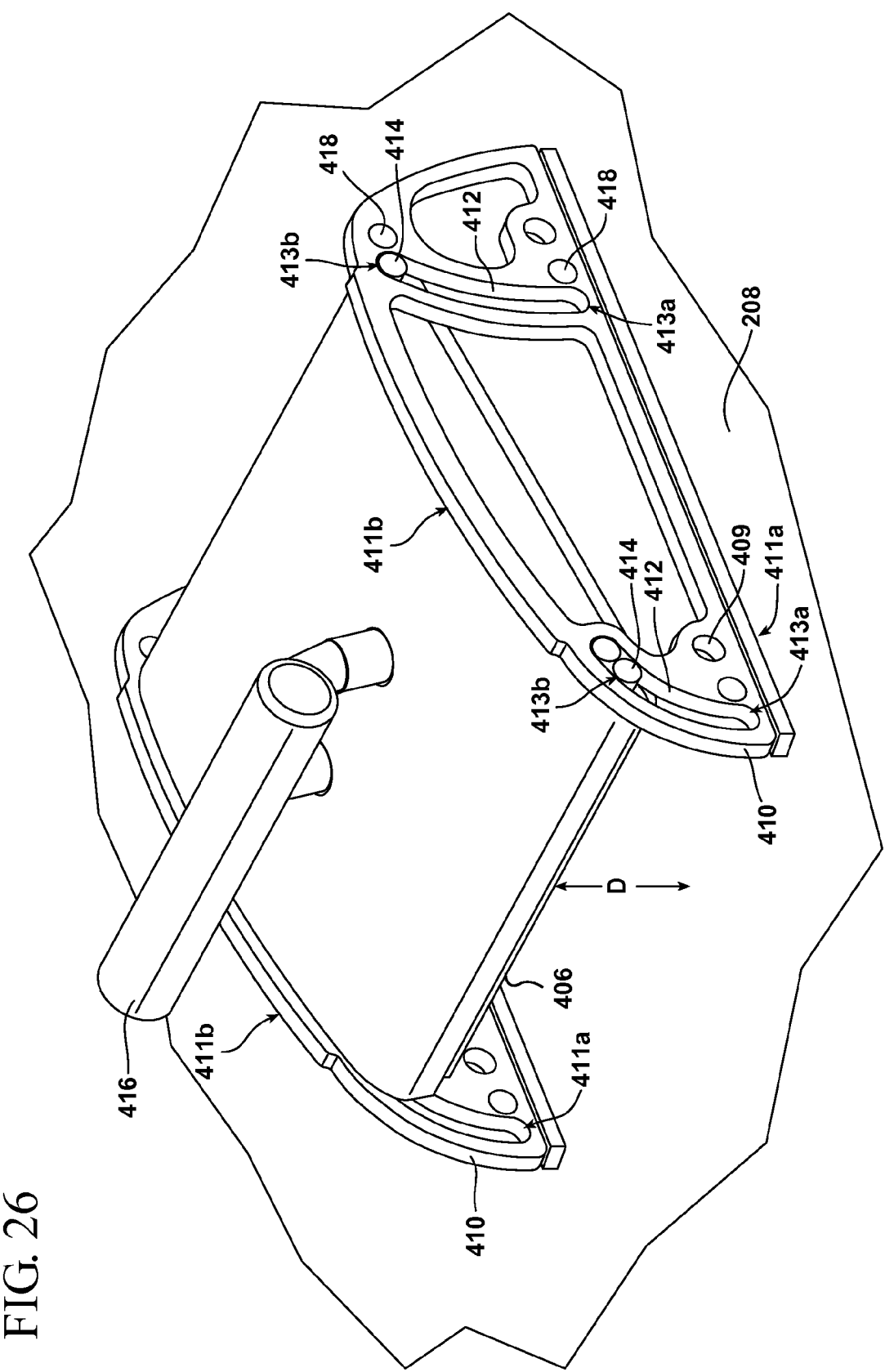
FIG. 26 is a perspective view of the transponder holder with the cover removed showing the transponder displaced from the support surface.
Figure 27:
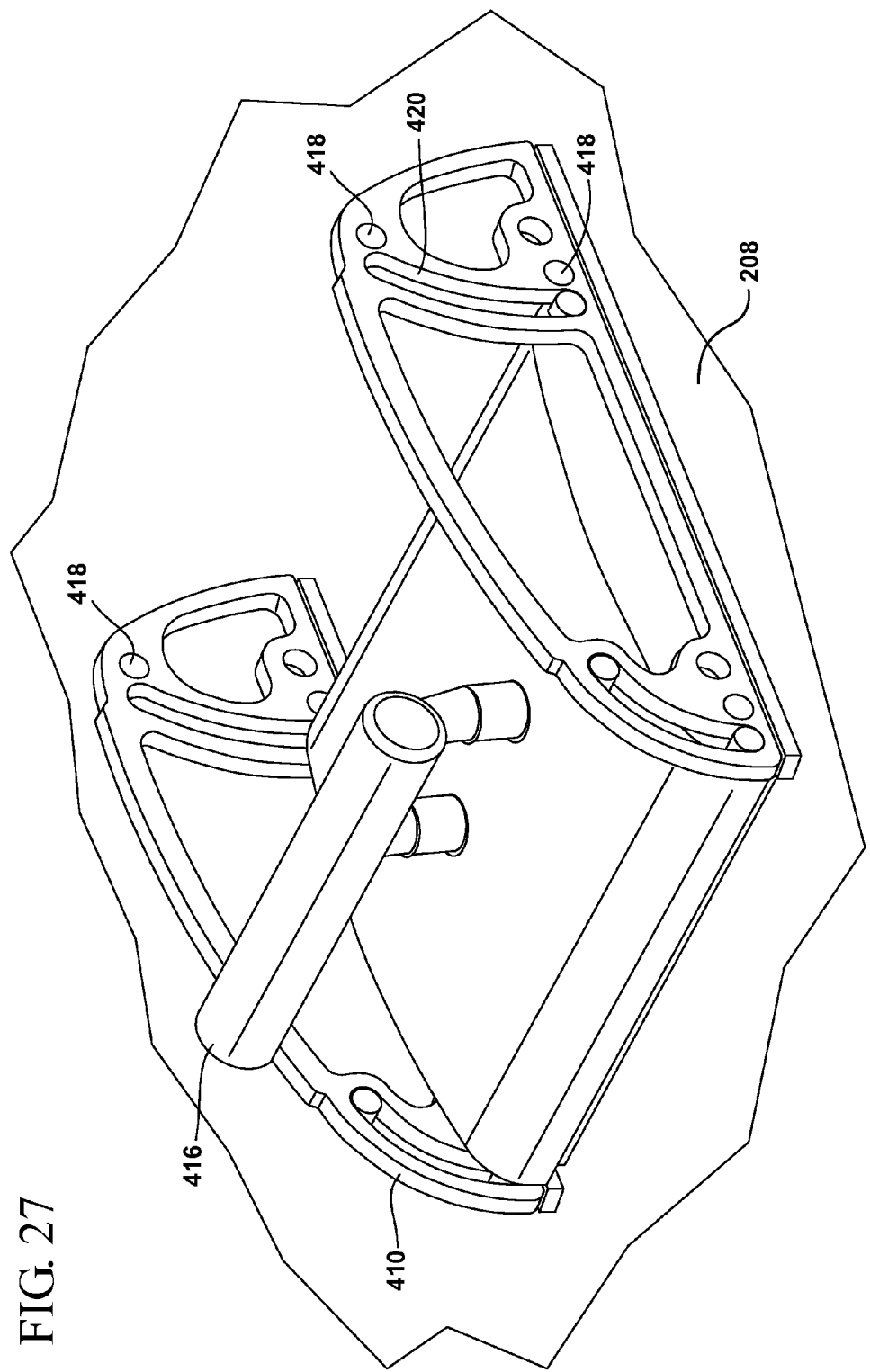
FIG. 27 is a perspective view of the holder with the frame removed showing the transponder engaging the support surface.

As shown in FIG. 26, the mounting plate 406 is in the second position where the transponder is displaced from the support surface 208. When a user urges the handle 416 forward, the mounting surface will move downwardly to the first position until the transponder is proximate to the support surface. In some embodiments, when the mounting plate is moved to the first position, the transponder can engage the support surface as shown in FIG. 27.

As in the previously described embodiment, retaining members 420 in the form of magnets may be disposed adjacent to the slot ends 418. The pins 414 may be ferromagnetic such that when the pins come in proximity of the magnets they tend to remain in the end positions. This helps keep the mounting plate 406 in the desired position even when subjected to vibrations such as a car traveling over the road.

As in the previously described embodiment, the housing 402 may be modified in order to include suction cup holders such that the device may be held to a sports structure using same. Alternatively, a pair of adhesive strips may be used to secure the transponder holder to the support surface.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the present application.

What is claimed:

1. A transponder holder for supporting a transponder on a support surface of a vehicle comprising:
   a housing including a back wall surrounded by a perimeter wall extending therefrom to form a housing interior;
   a transponder mounting plate adapted to support a transponder, the mounting plate being movably attached to the housing; and
   an actuator disposed on the housing for moving the mounting plate relative to the housing between a first position in which the mounting plate is positioned proximate to a front face of the housing and a second position in which the mounting plate is disposed within the housing interior and spaced a distance away from the front face;
   wherein the front face is adapted to be disposed adjacent a support surface so that the mounting plate is proximate to the support surface in the first position and is spaced away from the support structure in the second position.

2. The transponder holder of claim 1, wherein the actuator includes a user engagement portion disposed on a back surface of the housing, wherein movement of the user engagement portion causes the mounting plate to move between the first and second position.

3. The transponder holder of claim 2, wherein the user engagement portion is pivotally secured to the housing.

4. The transponder holder of claim 1, wherein the mounting plate is substantially flush with the front face when in the first position.

5. The transponder holder of claim 1, wherein the housing includes a securement device for removably securing the housing to the support surface.

6. The transponder holder of claim 5, wherein the securement device includes a pair of flanges extending from opposed sides of the housing and a suction cup secured to each flange.

7. The transponder holder of claim 1, wherein the housing interior defines a cavity into which the mounting plate recedes when in the second position.

8. The transponder holder of claim 1, further comprising:
   spaced guide members disposed within the housing interior and the mounting plate including projections in operative engagement with the guide members wherein the mounting plate is guided in its movement by the guide members.

9. The transponder holder of claim 1, wherein the mounting plate is hingedly attached to the housing.

10. The transponder holder of claim 9, wherein the actuator includes a knob rotatable between a first and second position and an actuating rod disposed between the knob and the plate, wherein rotation of the knob pivots the plate between the first and second positions.

11. A transponder holder comprising:
    a housing;

a plate adapted to receive a transponder thereon, the plate being selectively movable with respect to the housing, the plate including a plurality of pins extending therefrom;

a pair of spaced guide members disposed in the housing and including a plurality of arcuate slots formed therein, the plate pins extending into the slots wherein the movement of the plate is guided along an arcuate path by a cooperation between the pins and the slots; and an actuator operatively coupled to the plate for moving the plate between a first position in which the plate is positioned at a front end of the guide members and a second position in which the plate is positioned at a back end of the guide members.

12. The holder as defined by claim 11, wherein a transponder readable by a remote interrogator is disposable on the plate being readable when the plate is in the first position and being unreadable when the plate is in the second position.

13. The holder as defined in claim 11, wherein the housing includes a perimeter wall having a front face defining the opening to a housing interior, wherein the plate is positioned proximate to the front face in the first position and is positioned away from the front face in the second position so that the plate is retracted into the interior of the housing.

14. The holder as defined in claim 13, wherein the actuator includes rigid arm pivotally connected to the housing and the plate.

15. The holder as defined by claim 13, wherein the plate is generally flush with the front face of the housing when the plate is in the first position.

16. The holder as defined by claim 13, wherein the housing front face resides in a first plane and the plate is generally parallel to the first plane in both the first position and the second position.

17. The holder as defined by claim 13, wherein the front face and the plate reside on the first plane in the first position.

18. The holder as defined in claim 11, wherein the actuator includes a tab disposed on the arm and wherein rotation of the arm by the tab causes the plate to move between the first and second positions.

19. A transponder holder comprising:

a housing including a back wall surrounded by a perimeter wall extending therefrom to form a housing interior;

a plate hingedly attached to the housing, the plate being adapted to retain a transponder thereon;

an actuator disposed on the housing for moving the plate relative to the housing between a first position in which the plate is proximate to a front face of the housing and a second position in which the plate is displaced into the housing interior away from the front face.

20. The holder as defined in claim 19, wherein the actuator includes a knob rotatable between a first and second position and an actuating rod disposed between the knob and the plate, wherein rotation of the knob pivots the plate between the first and second positions.

21. The holder as defined in claim 20, wherein the actuator includes a biasing device for biasing the actuating rod away from the housing interior.

22. The holder as defined in claim 19, wherein the actuator includes an actuating rod having a first end in contact with a knob and a second end extending through the housing and operably connected to the plate.

23. The holder as defined in claim 19, further including a bracket, the bracket being securable to a structure, and the bracket being configured to removably receive the housing therein.

24. The holder as defined in claim 23, further including a securement device for securing the bracket to the structure, wherein the securement device includes at least one of a suction cup, adhesive strip, hook and loop fastener.

25. A selectively readable transponder comprising:

a transponder holder including a housing defining a housing interior;

a transponder adapted to communicate with a remote interrogator;

a plate moveably attached to the housing, the transponder being disposed on the plate;

an actuator disposed on the housing for selectively moving the transponder out of the housing interior and into contact with a windshield wherein the transponder is rendered readable by the interrogator and moving the transponder into the housing interior and out of contact with the windshield wherein the transponder is rendered unreadable.

26. The transponder as defined by claim 25, wherein the housing has a device to secure the housing to the windshield of a vehicle.

27. The transponder as defined in claim 25, further including a bracket adapted to be secured to a windshield of a vehicle, the transponder holder being removably disposed within the bracket.

28. The transponder as defined in claim 25, wherein the transponder is a flexible sticker tag adapted to function as a toll payment device, and the tag is adhesively secured to the plate.

* * * * *